US 8,427,060 B2

(12) United States Patent
Ge

(10) Patent No.: US 8,427,060 B2
(45) Date of Patent: Apr. 23, 2013

(54) HIGH LUMEN OUTPUT COLD CATHODE FLUORESCENT LAMP

(75) Inventor: Shichao Ge, San Jose, CA (US)

(73) Assignee: TBT Asset Management International Limited, Tortola (VG)

( * ) Notice: Subject to any disclaimer, the term of this patent is extended or adjusted under 35 U.S.C. 154(b) by 10 days.

(21) Appl. No.: 13/252,956

(22) Filed: Oct. 4, 2011

(65) Prior Publication Data
US 2012/0020068 A1 Jan. 26, 2012

Related U.S. Application Data

(63) Continuation of application No. 12/355,645, filed on Jan. 16, 2009, now abandoned, which is a continuation-in-part of application No. PCT/CN2007/002187, filed on Jul. 18, 2007.

(30) Foreign Application Priority Data

| Jul. 19, 2006 | (CN) | 2006 1 0052567 |
| Jul. 24, 2006 | (CN) | 2006 1 0052637 |
| Aug. 8, 2006 | (CN) | 2006 2 0106626 U |
| Apr. 29, 2007 | (CN) | 2007 1 0097407 |
| Apr. 29, 2007 | (CN) | 2007 2 0148654 U |
| Jul. 17, 2007 | (CN) | 2007 1 0130250 |

(51) Int. Cl.
H01J 17/34 (2006.01)
H01J 61/04 (2006.01)

(52) U.S. Cl.
USPC .............................. 315/51; 315/56

(58) Field of Classification Search .................. None
See application file for complete search history.

(56) References Cited

U.S. PATENT DOCUMENTS

| 4,958,102 A | 9/1990 | Wilson et al. |
| 6,316,872 B1 | 11/2001 | Ge et al. |
| 6,459,204 B1 | 10/2002 | Yan |
| 6,488,538 B1 | 12/2002 | Matsuba et al. |

(Continued)

FOREIGN PATENT DOCUMENTS

| CA | 2589220 A | 7/2006 |
| CN | 1725430 A | 1/2006 |

(Continued)

OTHER PUBLICATIONS

Holt, *Preliminary Results of Cold-Cathode Fluorescent Lamp Life as a Function of Lamp Current*, Linfinity Microelectronics Inc., Garden Grove, CA Jan. 16, 1997.

(Continued)

Primary Examiner — Crystal L Hammond

(57) ABSTRACT

In one embodiment, when the current density at the cathode is less than 0.2 mA/mm$^2$, cathode sputtering is avoided or reduced to such an extent that the life time of the CCFL is not significantly adversely affected. In another embodiment, the internal diameter (ID) of the CCFL tube is within the range of 3 to 16 mm. Preferably, the distance between the anode and cathode is within a range of about 200~1000 times of the internal diameter of the CCFL tube, and the distances between at least one section of the CCFL tube and two adjacent sections of the CCFL tube is less than about 5 times an outside diameter of the CCFL tube. Preferably, the efficiency of the CCFL is not less than about 55 lm/W.

26 Claims, 17 Drawing Sheets

U.S. PATENT DOCUMENTS

| | | |
|---|---|---|
| 6,515,433 B1 | 2/2003 | Ge et al. |
| 6,534,926 B1 | 3/2003 | Miller |
| 6,545,417 B2 | 4/2003 | Moon |
| 6,914,369 B2 * | 7/2005 | Liao .............................. 313/11 |
| 6,963,164 B2 | 11/2005 | Chow et al. |
| 7,038,397 B2 | 5/2006 | Komatsu et al. |
| 7,239,071 B2 | 7/2007 | Igarashi et al. |
| 2007/0170833 A1 | 7/2007 | Teva |

FOREIGN PATENT DOCUMENTS

| | | |
|---|---|---|
| CN | 1737419 A | 2/2006 |
| CN | 101128913 A | 2/2008 |
| EP | 1836720 | 9/2007 |
| EP | 2048692 A1 | 4/2009 |
| JP | 2005 085472 A | 3/2005 |
| JP | 2005 183172 A | 7/2005 |
| JP | 2005 268098 A | 9/2005 |
| JP | 2005 327485 A | 11/2005 |
| WO | WO2006072932 A2 | 7/2006 |
| WO | WO2006072932 A3 | 7/2006 |
| WO | WO2008011810 A1 | 1/2008 |

OTHER PUBLICATIONS

Ge, *What is theDifference Between a Fluorescent Light and a Neon Light?* www.howstuffworks.com/question293.htm.

L. E. Tannas, Jr., *Flat Panel Displays and CRTs*, Von Nostrand Reinhold, New York, 1985, pp. 339, 341.

CCFL Characteristics, www.maxim-ic.com/appnotes.cfm/an_pk/3528, May 31, 2005, pp. 1-5.

*Neon Sign*, http://en.wikipedia.org/wiki/Neon_sign, last modified Dec. 2, 2008, pp. 1-4.

Supplementary European Search Report for EP 07 78 5130, dated Nov. 22, 2010, 9 pages.

* cited by examiner

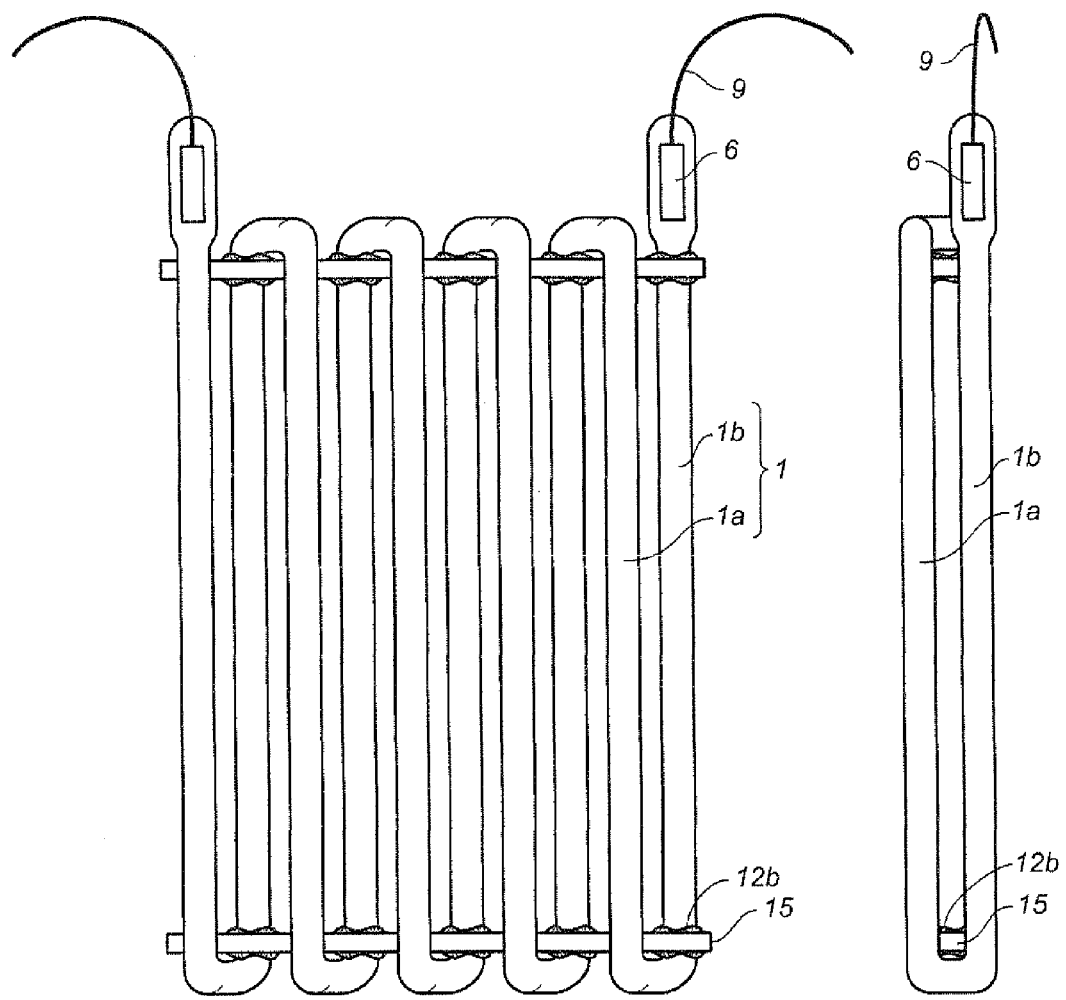
FIG. 6A  FIG. 6B
FIG. 6C

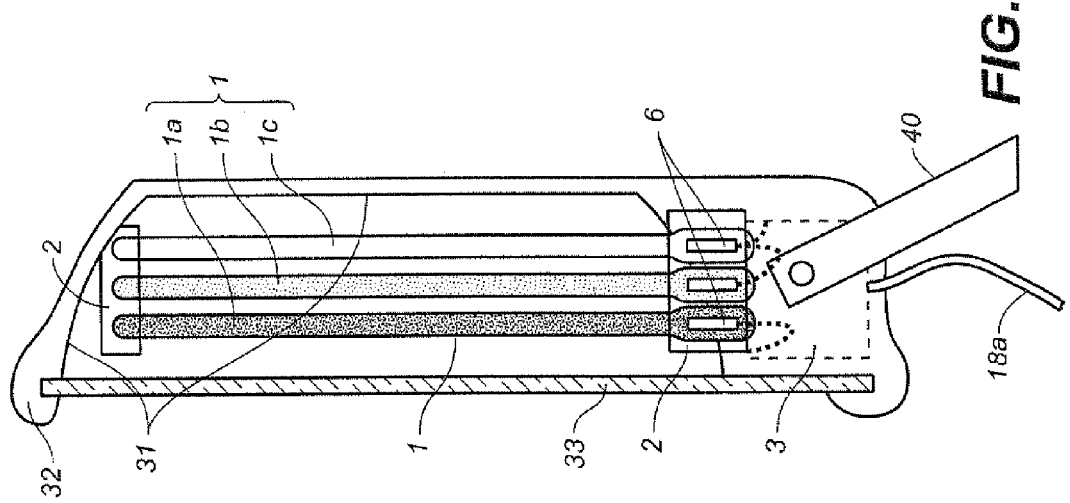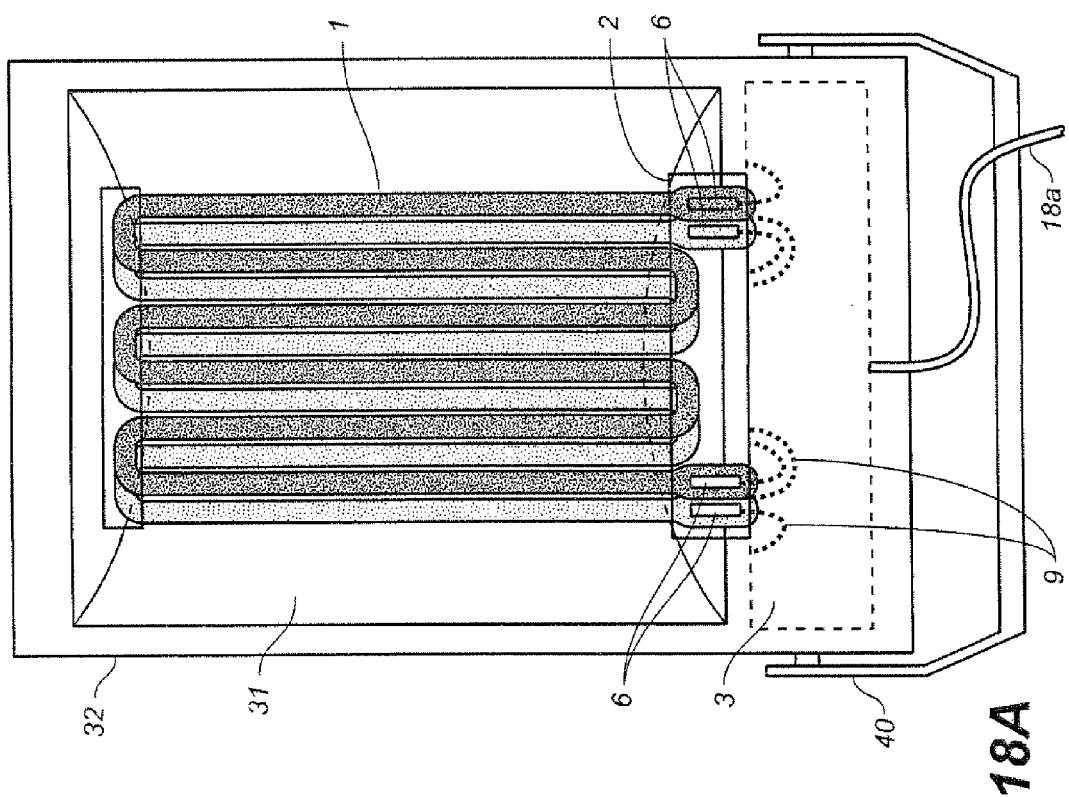

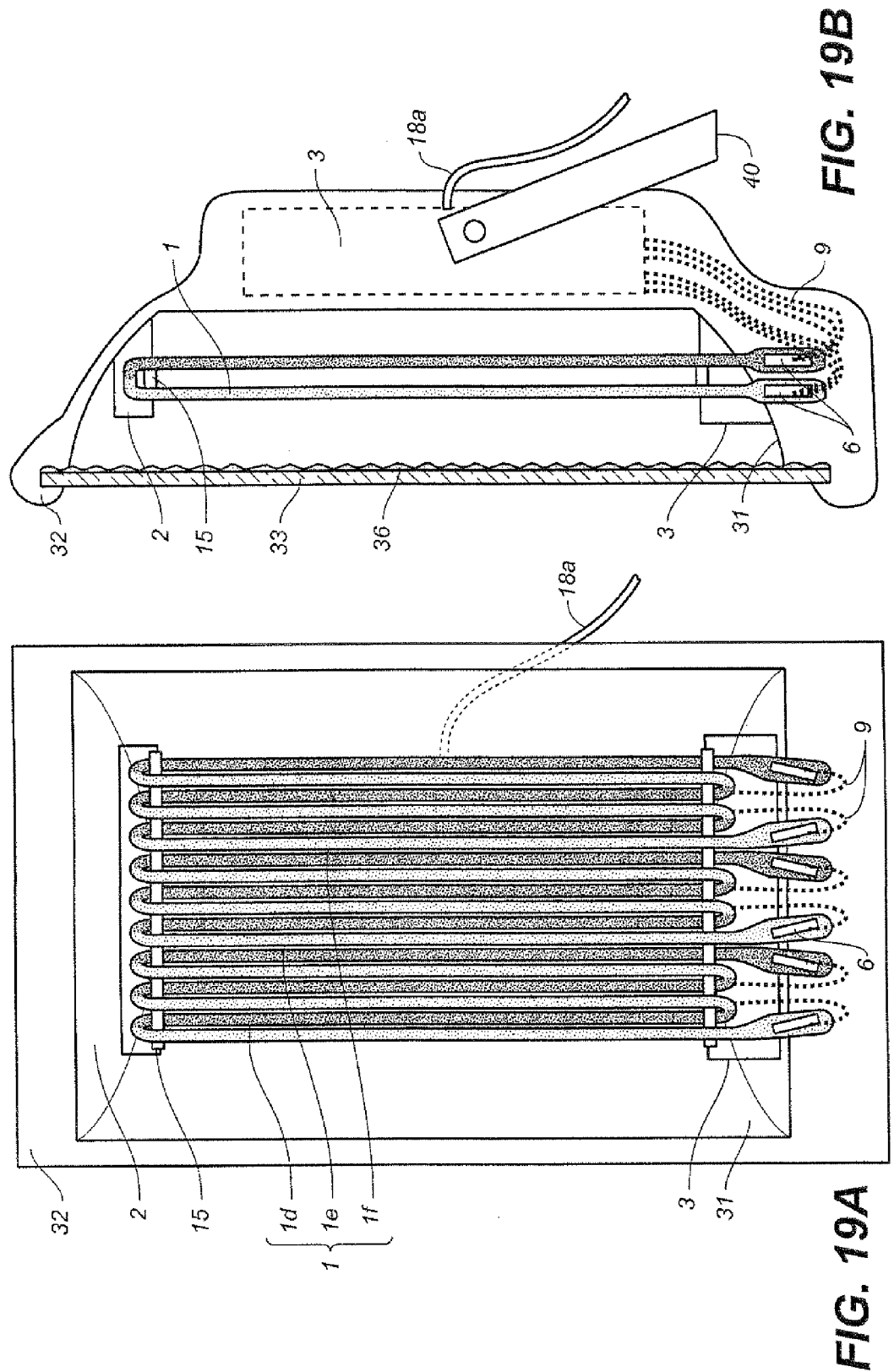

HIGH LUMEN OUTPUT COLD CATHODE FLUORESCENT LAMP

CLAIM OF PRIORITY

This application is a continuation of application Ser. No. 12/355,645 filed Jan. 16, 2009, which is a continuation-in-part application of International Application PCT/CN2007/002187, with an international filing date of Jul. 18, 2007, which claims the benefit of and priority from the following applications:
CN 200610052567.9 filed on Jul. 19, 2006;
CN 200610052637.0 filed on Jul. 24, 2006;
CN 200620106626.1 filed on Aug. 8, 2006;
CN 200710097407.0 filed on Apr. 29, 2007;
CN 200720148654.4 filed on Apr. 29, 2007; and
CN 200710130250.7 filed on Jul. 17, 2007.
The above applications are incorporated in their entireties herein by reference as if fully set forth herein.

BACKGROUND OF THE INVENTION

1. Field of Application

This invention is about a high lumen output Cold Cathode Fluorescent lamp (CCFL). It can be used for lighting applications that requires high lumen output, such as for street, tunnel, signage, bridge, building, shopping mall, square, etc. It can be used to replace the High Pressure Sodium lamp, High Pressure Mercury lamp, Electrodless lamp, Metal Halide lamp and High Power Hot Cathode Fluorescent Lamp. It can also be used as lamps with adjustable color temperature, dimming, multiple colors and adjustable multiple colors.

2. Technical Background

The current lighting technologies for street lighting with high lumen output mainly include Low Pressure Sodium lamp, High Pressure Sodium lamp, High Pressure Mercury lamp, Electrodless lamp, and Metal Halide lamp.

The Low Pressure Sodium lamp has Photopic vision efficiency of 180 lm/W, but its CRI (correlated color index) is very low, and is seldom used now.

High Pressure Sodium lamp has Photopic efficiency of 90~120 lm/W and lifetime up to 25,000 hours. It has been the main source for street and tunnel lighting. China's 80% street lamps use High Pressure Sodium lamp. But this lamp's CRI is also very low, about 20~25. Its color temperature is 2000~2400 Kelvin, which is a yellowish light. Its' Mesopic vision/Photopic vision=0.6 and its Mesopic vision efficiency is about 54~56 lm/W. Its ability to distinguish object is very poor and its ability to identify object is also very low, not good for safety reason. The high CRI white color High Pressure Sodium lamp only has efficiency of 37~48 lm/W.

The High Pressure Mercury lamp has efficiency of 50 lm/W; its CRI is about 45 and its lifetime is short. It is seldom used now.

The Electrodless lamp has long lifetime, with CRI>80, and a lamp system efficiency (including driver consumption)>60 lm/W. But its high cost and high electromagnetic interference severely restricts its applications.

The Metal Halide lamp's CRI is between 65~92, its lamp efficiency between 72~95 lm/W, its color temperature between 3000~5600 Kelvin, and its lifetime between 6,000~20,000 hours. But its lumen output decays rapidly; the uniformity of lamp color temperature is also poor, and the lamp system efficiency low. When input power variation is more than +/−10%, its color will change. The position of the lamp's cold point and its installation can easily affect the lamp's color temperature and lifetime. This type of lamp needs 5~15 minutes to get started. It will need another 10~15 minutes for restarting once it is turned off. The surface temperature of the lamp is very high. The sodium within the quartz lamp will migrate and cause the lamp's light color to change. The reaction between quartz—metal, and quartz out gassing will also shorten the lamp's lifetime. Its cost is also high. Its application for street and tunnel lamp is still very limited.

The current Cold Cathode Fluorescent lamp (CCFL) technology provides advantages such as lifetime of >20,000 hours (with LCD CCFL backlight providers claiming >50,000 hours), On/Off switching of over $10^8$ times, lamp system efficiency of >55 lm/W, and CRI>80. It has been used in broad applications in the LCD backlight system. It has also been used for making 2~8 W low power spiral shape energy saving lamps. The Cold Cathode Fluorescent lamp operates in the normal glow region of the Gas Discharge lamp I-V curve. Its cathode drop is about 145V, and its anode drop about 10V. According to the traditional theory, the CCFL works in the normal glow gas discharge field and its operating current is of the order of about $10^{-4}$~$10^{-2}$ A. Please see FIG. 2-24 on page 92 of "照明技术手册" 2004, 朱小清, 中国机械工业出版社, ISBN 7-111-13283-1 ("Lighting Technology Handbook," by Zu Xiao Qing, China Mechanical Industry Publishing Company, 2004, p. 92). This figure is reproduced as FIG. 21 of the present application. According to the traditional theory, the CCFL normal operating current is 5 mA and the upper limit is 8-10 mA. If the current is increased to above this upper limit, then the gas discharge will move into the abnormal glow region and its cathode drop will increase rapidly and cause great loss in efficiency. Also the cathode temperature will rapidly increase, causing the rate of metal sputtering in the cathode to increase rapidly and shortens the lamp lifetime. The CCFL lifetime is inversely proportional to the square of its operating current according to the following formula:

CCFL lifetime=$K/I^2$.

Where K is a constant, I is the operating current.

The above limitation is the main reason why up to now the CCFL can only be used for making lower power lamp. For example, the maximum voltage is 1500V, and the current is 10 mA. The maximum lamp power is only 1500×0.01=15 W. If one attempts to increase the current supplied to the CCFL, its life time decreases with the square of the current, which is undesirable. That is why up to now CCFL has never been considered as a good candidate for general lighting as its lumen output is limited because everyone believes that the best CCFL operating range in the "Normal Glow Discharge" region for operating current is 5 mA.

According to the traditional theory of CCFL, the CCFL's best efficiency occurs when the internal diameter (ID) of its lamp tubing is between 1.2~2 mm, and its outside diameter (OD) is less than 2~4.1 mm. If larger diameter lamp tubing is used for the CCFL, its lumen output efficiency will greatly decrease due to the effect of the increase in self absorption among its radiation photons and voltage drop in the lamp tubing of the lamp. According to the traditional theory of CCFL, it is a highly difficult technical problem to produce high efficiency CCFL with high lumen output of several thousand lumen or higher. That is why the currently available Cold Cathode Fluorescent lamp cannot be used to replace the High Pressure Sodium lamp, High Pressure Mercury lamp, Electrodless lamp, Metal Halide lamp and high power Hot Cathode Fluorescent lamp in the applications for street lighting, tunnel lighting, signage lighting, and in places like bridges, buildings, malls, public squares that require large lumen output for illumination.

The Neon Light is very similar to CCFL, as it is also a light source that functions in the normal glow region of the Gas Discharge I-V curve. The Neon Light uses large diameter glass lamp tubing, large operating current, such as 25~60 mA, several thousand to twenty thousand volt as its operating voltage, low current density on its lamp and lamp operates in close to room temperature. Its white color light efficiency is only 15~30 lm/W and its lifetime are roughly 3,000 hours. It is mainly used in advertising display. It is not possible to use the current neon technology to make high efficiency and long lifetime lamp for street and tunnel lighting.

SUMMARY OF THE INVENTION

One aspect of the invention is based on the recognition that the above relationship between CCFL life time and operating current holds only for CCFLs with electrodes of certain sizes. The cathode structure and the material therein may also be factors. When larger electrodes are employed than in conventional CCFLs, larger currents will not cause cathode sputtering, which is the main reason for the CCFL lifetime to be inversely proportional to the square of its operating current. Thus, if the current density at the cathode is limited to a certain upper limit, cathode sputtering is avoided or reduced to such an extent that the life time of the CCFL is not significantly adversely affected.

In one embodiment, when the current density at the cathode is less than $0.2 \text{ mA/mm}^2$, cathode sputtering is avoided or reduced to such an extent that the life time of the CCFL is not significantly adversely affected. Preferably, the efficiency of the CCFL is not less than about 55 lm/W.

According to the traditional theory of CCFL, the CCFL's best efficiency occurs when the internal diameter (ID) of its lamp tubing is between 1.2~2 mm, and its outside diameter (OD) is less than 2~4.1 mm. This understanding is correct only for short CCFLs, e.g., CCFLs shorter than 400 mm. If the length of the CCFL is longer than 400 mm, then the best efficiency occurs at internal diameter (ID) larger than 2 mm. In another embodiment, the internal diameter (ID) of the CCFL tube is within the range of 3 to 16 mm. Preferably, the efficiency of the CCFL is not less than about 55 lm/W.

All patents, patent applications, articles, books, specifications, standards, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIG. 6: Another preferred embodiment of High Lumen Output CCFL.
FIG. 18: Another preferred embodiment of High Lumen Output CCFL for Signage.
FIGS. 19A and 19B: Another preferred embodiment of High Lumen Output CCFL for Signage.

Identical components in this application are labeled by the same numerals.

DETAILED DESCRIPTION OF EXEMPLARY EMBODIMENTS

Figure 21:
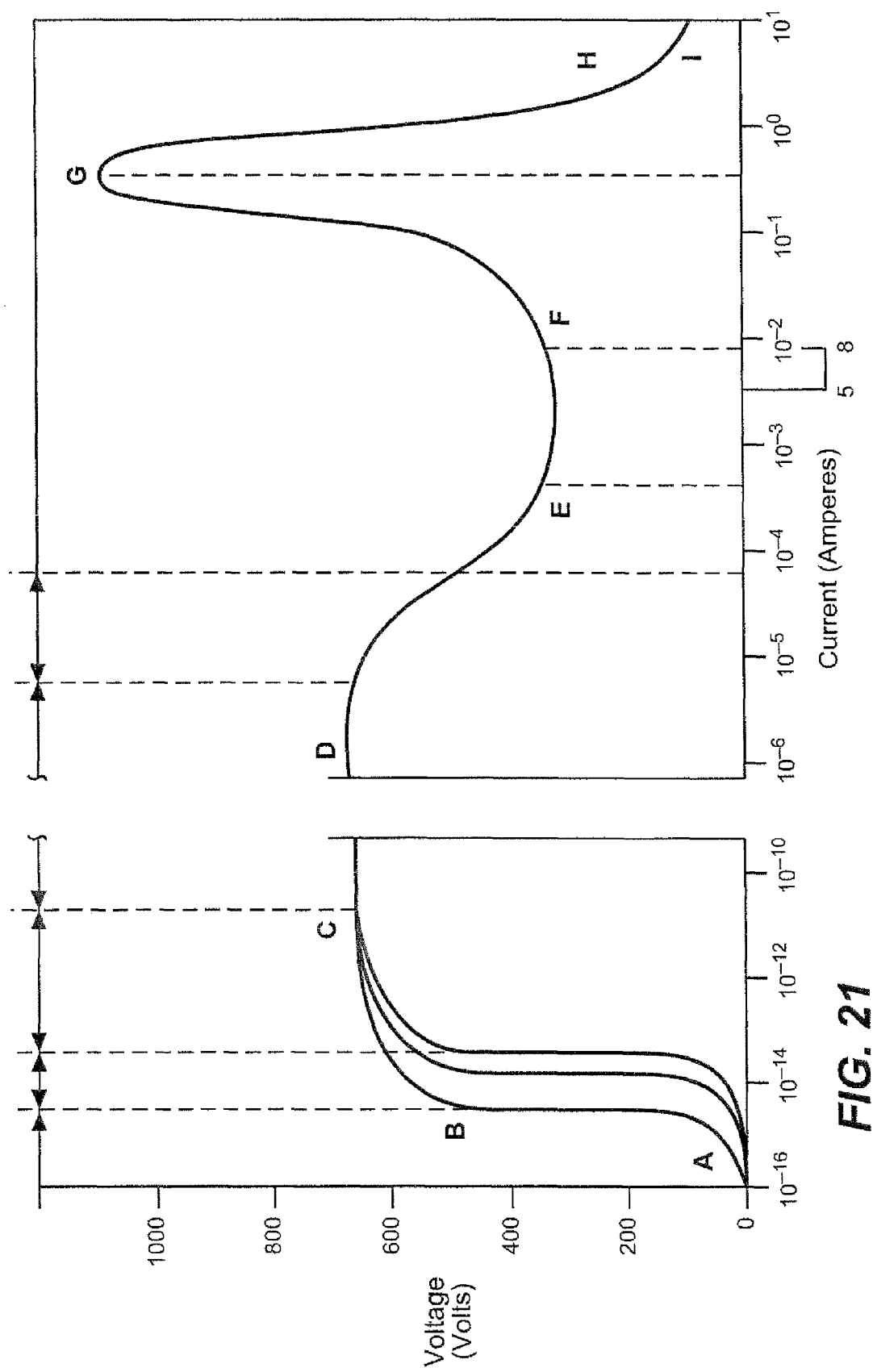
FIG. 21: A graphical plot of voltage against current (I-V curve) of gas discharge in lighting applications, taken from "照明技术手册" 2004, 朱小清, 中国机械工业出版社, ISBN 7-111-13283-1 ("Lighting Technology Handbook," by Zu Xiao Qing, China Mechanical Industry Publishing Company, 2004, p. 92), useful for illustrating the embodiments of the invention.

FIG. 21 shows a graphical plot of voltage against current (I-V curve) of gas discharge in lighting applications, taken from "照明技术手册" 2004, 朱小清, 中国机械工业出版社, ISBN 7-111-13283-1 ("Lighting Technology Handbook," by Zu Xiao Qing, China Mechanical Industry Publishing Company, 2004, p. 92), useful for illustrating the embodiments of the invention. As shown in FIG. 21, the normal glow region is the area between E and F. The area between C and D is the Townsend discharge region, that between D and E a transition region, that between F and G the abnormal glow region, that between G and H another transition region and that between H and I the are discharge region.

This I-V characteristic curve for gas discharge devices has been used by the lighting industry for many years. It is commonly believed that the CCFL device operating in the "Normal Glow Discharge" region should have driving current of less than 5 mA. If the driving current is higher than 5 mA, the gas charge device will move from the "Normal Glow Discharge" region to "Abnormal Glow Discharge" region, and the sputtering of cathode will occur and its life time will be very short.

One aspect of the invention is based on the recognition that the I-V curve in FIG. 21 is not a static one but can shift depending on the size of the cathode. The cathode structure and material may also affect the curve. It is found that when larger cathodes are used than in conventional CCFL designs, the I-V curve is shifted to the right, so that the normal glow region spans a region of currents of higher values than the conventional range of $10^{-4}$~$10^{-2}$ A, without entering the abnormal glow region. This means that larger currents may be used, without causing cathode sputtering. Thus, if the current density at the cathode is limited to a certain upper limit, cathode sputtering is avoided or reduced to such an extent that the life time of the CCFL is not significantly adversely affected. One parameter that is important in CCFL design, according to this aspect of the invention, is the current density at the cathode.

In one embodiment, when the current density at the cathode is less than 0.2 mA/mm$^2$, cathode sputtering is avoided or reduced to such an extent that the life time of the CCFL is not significantly adversely affected. Preferably, the efficiency of the CCFL is not less than about 55 lm/W. Also preferably the electrodes have good heat dissipation (e.g. electrode temperature <150° C. for hard glass). Under these conditions, the lamp life do not decrease with increasing current even when the current is much larger than 10 mA.

It is found that if the current density of the electrode is kept within 0.01~0.2 mA/mm$^2$, with the operating current of the CCFL device between 0.8~8 mA/mm$^2$, and operating within 50 Hz~100 kHz, the CCFL device can be driven to 100 W with 77 mA driving current and still remains in the "Normal Glow Discharge" region and enjoys normal good life time. Thus the "Normal Glow Discharge" region can be expanded beyond the 5 mA into over 100 mA when the electrode's current density is within 0.01~0.2 mA/mm$^2$.

Another aspect of the invention is based on the recognition that the CCFL efficiency depends on the ratio of arc length to the ID. If the ratio is larger than a certain value (such as about 200, or 500), optimal efficiency can be achieved, which is not dependent on ID alone. In this way, the system efficiency can be up to 721 lm/W or more, which is higher than all CCFL efficiency reported currently.

The current applications for CCFL are for LCD back lights, and for low wattage lamps for replacement of incandescent bulbs in lighting fixtures. For both types of applications, the amount of space available for fitting in the CCFL is limited. This limits the length of CCFL that will fit into such limited space. For LCD back lights, for example, the length of the CCFL is typically limited to not more than about 400 mm. Those who studied the issue of optimum efficiency of CCFLs with lengths of this magnitude concluded that the 1.2~2 mm diameter tubing produces the best efficiency for CCFL. This lead to the application of using 1.2~2.0 mm diameter tubing for most of the backlight in today's LCD display panels.

Traditionally those working in the CCFL art regarded the CCFL tube diameter and length as two independent variables. It is discovered, however, that using 3.0~4.0 mm ID tubing for 1000~1600 mm length CCFL lamp will provide the best efficiency. Further increasing the ID to 6 mm resulted in drastically decreased efficiency. Another aspect of the invention is related to the CCFL diameter and length relationship to the efficiency of CCFL device. When the ratio of the length of the CCFL to its diameter is in the range 200~1000, it is found that the CCFL device enjoys high efficiency without any restriction to its diameter. When the 100 W CCFL device is driven with 60 mA, following this rule yielded system efficiency of 70 lumens/W including its controlling ballast. (This is equivalent to ~82 lumen/W for CCFL efficiency alone, assuming a 15% loss in the ballast, which efficiency is better than that of the 100 W Hot Cathode fluorescent lamp). Set forth below are experimental data illustrating the above features. Experimental data showing various CCFL devices with electrode current density within 0.01 mA~0.2 mA/mm$^2$ and CCFL length/ID ratio within range of 200~1000

| Type | Power (W) | Tube ID (mm) | CCFL length (mm) | Length/ID | Driving current (mA) | Electrode surface (mm$^2$) | Electrode current density (mA/mm$^2$) | Color temperature (K) | System Efficiency (lm/W)* |
|---|---|---|---|---|---|---|---|---|---|
| Spiral | 60 | 4.8 | 2200 | 458 | 40 | 340 | 0.118 | 4100 | 54 |
| Flat spiral | 80 | 6.2 | 4200 | 677 | 55 | 300 | 0.18 | 2700 | 79 |
| Flat spiral | 100 | 7.8 | 4620 | 592 | 60 | 704 | 0.085 | 4100 | 70 |
| Flat spiral | 110 | 9.6 | 5260 | 548 | 60 | 704 | 0.085 | 2700 | 70 |
| Flat spiral | 40 | 4.8 | 1760 | 367 | 25 | 340 | 0.07 | Red | 51 |
| Flat spiral | 40 | 4.8 | 1760 | 367 | 25 | 340 | 0.07 | Green | 85 |
| Flat spiral | 40 | 4.8 | 1760 | 367 | 25 | 340 | 0.07 | Blue | 23 |

*System efficiency including driver.

In the table above, the "electrode surface" indicates the area of the cathode that emits electrons, and is the area used in calculating the Electrode current density in the table, and in calculating the upper current density limit of 0.2 mA/mm$^2$ described above. System efficiency is defined as efficiency taking into account the power loss (i.e. power consumption) in the ballast as well as that in the CCFL tube of the CCFL lamp (i.e. efficiency of CCFL tube together with ballast).

A CCFL sample was also tested over time, with the following results.

High Power lamp Lifetime Test
Lamp power: 80 W.
Glass tube: OD=8 mm, ID=6.2 mm,
Tube length (distance between two electrodes): 4.2 m;
Tube length/ID=677.
Electron emission surface area of the cathode: 300 mm$^2$;
Tube current: 55 mA;
Current density of the cathode: 0.18 mA/mm$^2$.
The initial efficiency at 100 hr.: 79 lm/W.
The light decay is 20% at 10000 hrs.

Figure 22:
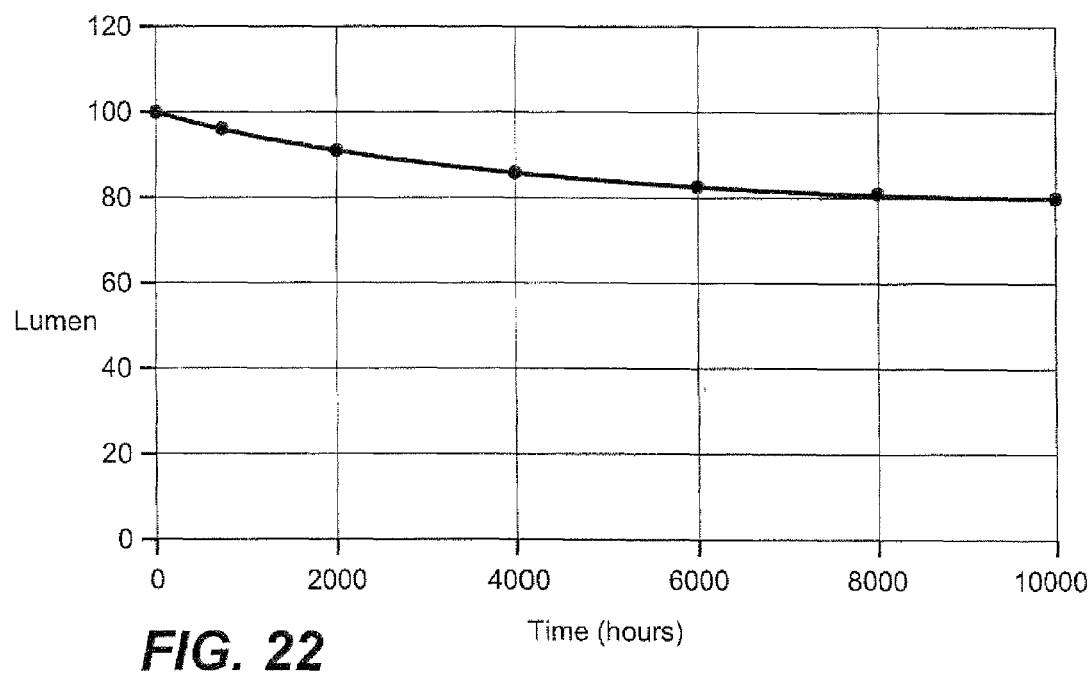
FIG. 22: A graphical plot illustrating light decay that was observed over 10,000 hours of operating a CCFL sample.
Figure 23:
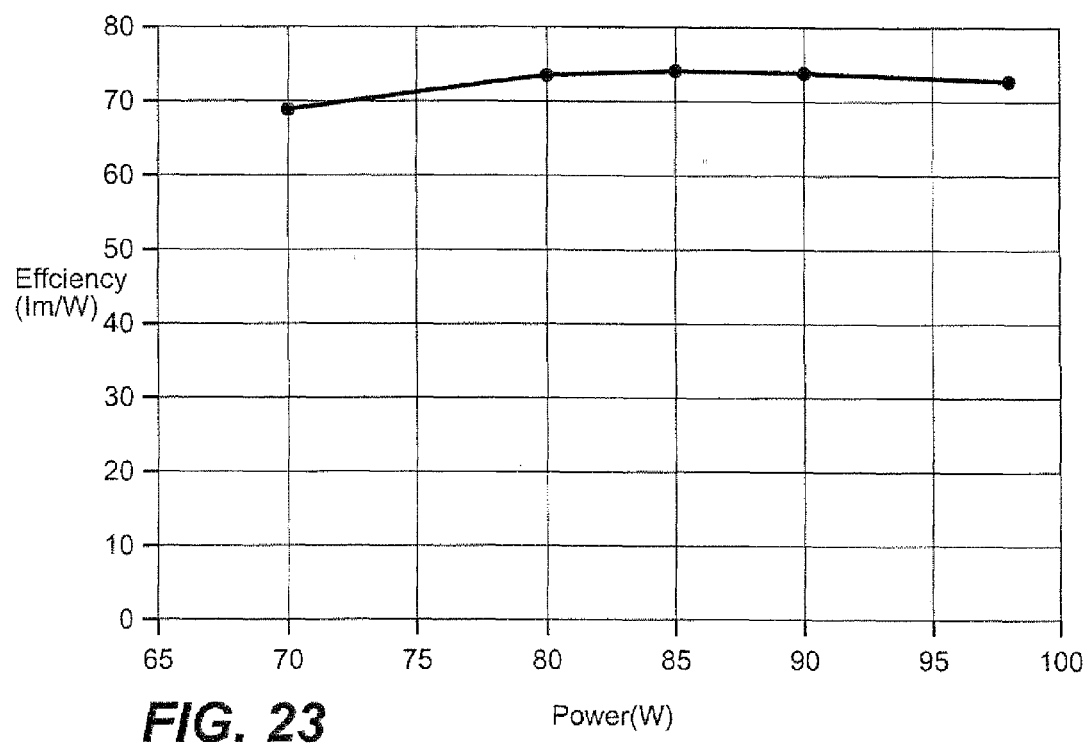
FIG. 23: A graphical plot of efficiency plotted against power illustrating the test results of another CCFL sample, using 45 kHz AC driving current, a non-dimmable driver and at room temperature.

The small light decay that was observed over 10,000 hours of operating the CCFL sample indicates a small amount of cathode sputtering. The decay is illustrated in FIG. 22. The test results of another sample is illustrated in FIG. 23, using 45 kHz AC driving current, a non-dimmable driver and at room temperature.

One possible explanation of the relationship between CCFL efficiency and the length to ID ratio of the CCFL tube is as follows. With an optimum ID of about 2 mm and length of 400 mm of the CCFL tube, all of the UV light generated by the mercury vapor is converted by the phosphor layer on the CCFL tube inner surface to visible light, and the phosphor layer becomes saturated by the UV light in this process. Hence, any further increase in driving current will not be effective in generating more visible light, and will increase the cathode voltage drop and reduce the tube voltage drop. Moreover, the increased current will be converted into heat instead, which causes the temperature of the mercury vapor to rise, thereby reducing its UV generation efficiency. This results in a fall in CCFL efficiency. However, if the length of the CCFL tube is more than 400 mm so that the ratio of CCFL tube length to ID is not within the range of 200 to 1,000, an ID of 2 mm will not be optimum, since the phosphor layer will have a larger surface area to absorb the UV light, and will not be saturated by the UV light.

Hence, when current is increased, the phosphor layer will not be saturated, but will convert the extra UV light generated to visible light. Therefore, when the length of the CCFL tube is increased, the ID of the tube should also be increased to achieve optimum efficiency.

One additional embodiment of this invention provides a high efficiency and high lumen output CCFL for general lighting, with lumen output as high as 800~50,000 lumens or even higher. This is much higher than the existing CCFL spiral shape lamp. Its lamp system efficiency is >65 lm/W, much higher than the neon lamp and the CCFL spiral lamp based on existing technology. Its lifetime is also much longer than the existing neon lamp. This embodiment of high lumen output CCFL can start immediately and there is no need to wait for restarting after it is turned off. It also provides broad linear dimming range. It can also provide luminaire with various color temperature, and adjustable color temperature. It can also make luminaire with various color and adjustable multiple colors.

The high lumen output CCFL of this embodiment includes at least one CCFL tube, means to secure the CCFL tube, at least one driver, its housing and an electrical connector for input power. The driver has its input through a wire connected to the electrical connector to receive power from outside power sources. The driver has its output through a wire connected to the electrodes of the CCFL tube. The at least one CCFL tube, the means to secure the CCFL tube, driver and its housing and its electrical connector are connected together to form a unitary lamp. The CCFL tube has a diameter of 5~16 mm, a length between the two electrodes of the CCFL tube of 200~1000 times its diameter. The CCFL tube electrode has an electron emission area of 100~2000 mm$^2$, and a ratio between electrode electron emission to its emission area is 0.01~0.2 mA/mm$^2$. The CCFL tube's operating current density is between 0.8~8 mA/mm$^2$, and its operating frequency is between 50 Hz~100 kHz.

The large diameter CCFL tube is arranged on at least a flat plane, concave plane or cylindrical plane. Sections of the CCFL tube (or individual CCFL tubes) are aligned in parallel arrangement along substantially the same direction, in a single layer cross arrangement, two layers or multiple-layer parallel arrangement or cross arrangements. The CCFL tube is bent to form into at least two sections that are aligned closely together, or at least two CCFL tubes or more than two CCFL tubes in close alignment. The distance between adjacent sections of the CCFL tube (or individual CCFL tubes) is less than 5 times the outside diameter of the CCFL tube. This will enable the heat generated from the different sections of the CCFL tube to mutually heat up one another. If appropriate wattage, CCFL tube diameter, separation between adjacent sections of the CCFL tube, CCFL tube operating current, CCFL tube heat dissipation condition and CCFL tube operating gas type and its pressure are selected, the CCFL will operate around its optimum temperature to achieve high efficiency. Based on the above design parameters and design, the CCFL can achieve output between 800~50,000 lumen.

The CCFL tube can be any one of the follow geometrical shapes: "U" shape, multi-"U" shape, multi-"U" shape by bridge forming technique, "H" shape, multi-"H" shape, Serpentine shape, "D" shape, linear shape, square shape with rounded corners, rectangular shape with rounded corners, round shape, conical shape, single or double spiral shape, flat plane shape using single or double spiral winding technique.

The CCFL tube has at least one electrode at each of its two ends. The electrodes can be electrodes used by existing CCFL or neon light. The glass enclosure of the electrode and the CCFL tube situates in the same level plane or concave plane, or it can be bent backward to the backside of the CCFL tube. The glass enclosure of the electrode has a diameter between 1~5 times of the outside diameter of the CCFL tube. This is to make sure the enclosure of the electrode can house a big enough electrode to provide enough current for the CCFL tube and will not cause the temperature of the electrode to be too high, which may reduce CCFL lifetime, will not cause increase in CCFL cathode voltage drop and lower its efficiency, and will not cause metal sputtering in electrode to accelerate, thereby reducing CCFL lifetime.

The CCFL tube in this embodiment is being arranged to form multi-U shape in two parallel planes, to minimize area occupied by CCFL tubing, while also preventing sections of the CCFL tube to be too close to one another, which may cause high temperature in CCFL, resulting in reduced efficiency. Securing means between the two parallel layers of CCFL tube is employed to increase mechanical strength. This securing means can be square shape or cylindrical shaped and made of glass, steel reinforced glass, metal, plastic or porcelain. Soft glue such as silicon, resin, silicon rubber, UV harden glue or plastic layer is used between CCFL tubes and this securing means to provide soft shock absorbing layer to the CCFL tubes.

The CCFL tube pattern is of cylindrical shape, pagoda shape, conical shape, or spherical shape. There is a soft glue layer between the top of the driver housing and the at least one winding of CCFL tube to secure the CCFL tube to the driver housing. The CCFL electrodes shall be arranged either parallel or perpendicular to the direction of the axis of the CCFL spiral lamp, or along the same direction of the CCFL tube spiral winding.

The said CCFL tube uses soft glass or hard glass. The said CCFL tube has at least one CCFL tube for emitting same color, or at least two CCFL tubes for emitting different colors. When emitting different colors, one CCFL tube is of low color temperature phosphor, the other one CCFL tube with blue, green phosphor; or one CCFL tube is of low color temperature phosphor and the other one CCFL tube with high color temperature phosphor, or at least one CCFL tube each with red, blue, green phosphor, or one CCFL tube with any color phosphor.

The said large diameter CCFL tube can also contain high temperature mercury amalgam to increase the CCFL tube's wattage loading per its length, in order to reduce the size of the CCFL tube and its fixture.

The means to secure the CCFL tube to the driver housing provides soft cushion to both surfaces. This can be soft glue or other mechanical structure. This means connects together the CCFL tube, driver and its connector.

The driver is a DC/AC or AC/AC type of converter. It converts the input 110V~230V, 50 Hz or 60 Hz, AC power or 4 volt to 400 volt DC power or high frequency power into suitable voltage for operating CCFL tube. The operating voltage is between 400~3000V, operating frequency is 50 Hz~100 kHz. When both the input and output frequency is 50 Hz or 60 Hz, the driver can use magnetic flux leakage transformer to produce the suitable operating voltage for CCFL. When input power is either DC or 50 Hz~60 Hz AC and the output is high frequency voltage, driver is electronic DC/AC or AC/AC converter. The CCFL is operated on AC power. The electrodes at both ends of the CCFL operate as cathode and anode. The driver output current is set based on the current density designed for that particular CCFL. It will enable the electrode to provide enough current to meet the requirement of the CCFL tube operating current density between 0.8~8 mA/mm$^2$.

The driver, the CCFL tube and the securing means form a unitary body. The driver can also be separated into components, with the driver's high voltage transformer and its accessories (e.g. capacitor and inductor) together with the said CCFL tube and its securing means into a unitary body and the rest of the driver into a separate installation.

The driver also includes On/Off switching of lamp, dimming, adjustable color temperatures, adjustable multiple colors, or timer control circuitries to provide dimming, adjustable color temperature, adjustable multiple colors or timer controlled luminaire. It also includes wireless control by using infrared, radio frequency, optical or sound control circuitries to provide wireless control for On/Off, dimming, adjustable color temperature and adjustable multiple colors luminaires.

The CCFL in this embodiment, with an output of 800~50,000 lumen, provides a much higher lumen output than the existing spiral shape CCFL lamp. The CCFL system efficiency of 55~75 lm/W is much higher than that of the existing Neon light, as well as the existing spiral shape CCFL lamp. The equivalent CCFL efficiency (without counting driver loss) will be 65~88 lm/W or higher. Its lifetime of 30,000~60,000 hours is also much higher than the existing Neon light. It can start or restart immediately, it has broad linear dimming range, and it can provide dimmable, adjustable color temperature and adjustable multiple color luminaires.

The CCFL in this embodiment can be used for lighting applications for street, tunnel, mall, factory, courtyard, building, signage, parking lot.

The CCFL in this embodiment can be used for static or dynamic illumination; it can be used to provide static or dynamic illumination for signage, illumination for courtyard and building. It can be used to provide adjustable color temperature according to its needs for street, mall, factory, tunnel, parking lot and residential applications.

The CCFL in this embodiment, when compare to existing technologies, has the characteristic of high lumen output, high visible light, high efficiency, long lifetime, long On/Off switch lifetime, broad and linear dimming range, low cost, can be use to provide light of 2000~8000 Kelvin color temperatures. It can be used as adjustable color temperature luminaire, various color lamp and adjustable multiple color luminaire. They can be used for lighting applications that requires high lumen outputs such as for street, tunnel, signage, bridge, building, mall, office, and public square.

Figure 1:
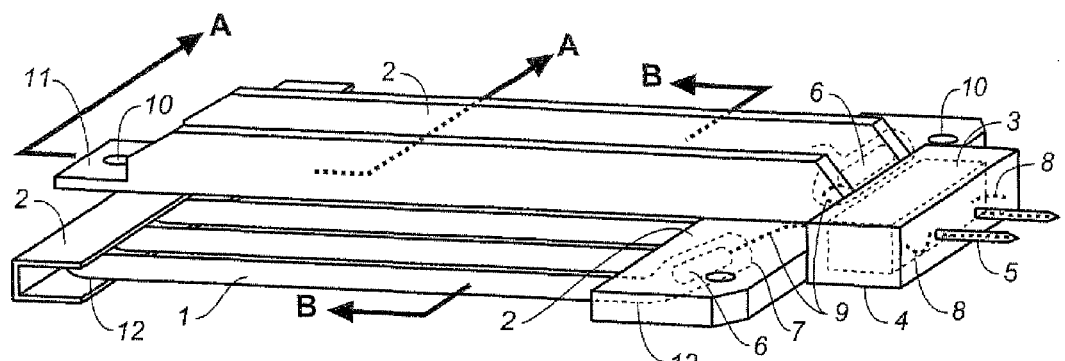
FIG. 1: High Lumen Output CCFL preferred embodiment

FIG. 1 is a preferred embodiment of High Lumen Output CCFL of this invention. It consists of at least one large diameter CCFL tube 1, a means 2 to secure CCFL tube 1, the at least one driver 3 and its housing 4 and its electrical connector 5. The said large diameter CCFL glass lamp tubing has an outside diameter between 5~16 mm, the length between the CCFL tube's two electrodes is 200~1,000 times of the outside diameter of the CCFL glass lamp tubing. The said CCFL tube 1 has electrode 6 with electron emission area between 100~2000 mm$^2$. The ratio of the cathode emission current and the cathode emission area is 0.01~0.2 mA/mm$^2$. The said electron emission area of the electrode is the area that the electrode uses to emit electron as a cathode. The said CCFL tube 1 is operating between 50 Hz~100 k Hz and in a lamp current density between 0.8~8 mA/mm$^2$.

The said large diameter CCFL tube 1 is bent to form at least two closely aligned sections, or is formed by at least two CCFL tubes or more than two CCFL tubes in close alignment. The distance between the adjacent CCFL tubes is less than 5 times the outside diameter of the CCFL tube. This will enable the heat released from the CCFL tube to provide suitable energy to heat up the adjacent CCFL tubes. Based on its designed wattage to select appropriate CCFL tube diameter, CCFL tube adjacent distance, CCFL tube operating current, CCFL tube heat dissipation condition and CCFL tube operating gas and its pressure, and make sure the CCFL tube operates in its optimum temperature to achieve high efficiency. The said CCFL tube has at least one electrode 6 on each end. The electrode 6 can be of the same design of the existing CCFL or Neon electrode. The glass enclosure 7 of the electrode has diameter between 1~5 times the diameter of the CCFL tube. This is to make sure it can provide big enough space for electrode to provide enough current for the CCFL tube and will not cause the temperature of the electrode to rise, will not reduce CCFL lifetime, will not cause increase of CCFL cathode voltage and lower its efficiency, will not cause metal sputtering in electrode and reduce mercury content inside CCFL tube to reduce CCFL lifetime. For example, the CCFL electrode has electron emission area between 100~2000 mm$^2$, the ratio between the electrode emission current and its electron emission area of the electrode is between 0.01~0.2 mA/mm$^2$. The said electrode 7 and CCFL tube 1 is situated in the same level plane or concave plane. The said driver 3 has input power wire 8 connects to the electrical connector 5, to enable driver to connect to outside power source. Driver output wire 9 connects to electrode 6 of the CCFL tube 1. The said driver converts input power from outside electrical source into suitable operating voltage for the CCFL. When outside electrical source is turned on, the output of the driver can cause CCFL tube 1 to turn on. The said driver 3 is a DC/AC, AC/AC converter. The said driver converts input AC voltage such as 110V to 230V, 50 Hz or 60 Hz from city power supply, or a 4V~400V DC voltage or high frequency voltage into suitable operating voltage for CCFL 1. Such as 50 Hz~100 kHz, 400~3,000V. When the driver is operating at 50 Hz or 60 Hz, the driver can use magnetic flux leakage transformer to produce the suitable operating voltage for CCFL. When driver is operating in high frequency of 20 kHz~100 kHz, the driver 3 is an electronic DC/AC or AC/AC converter. The said driver output current according to the designed current density of CCFL tube 1.

In FIG. 1, the said at least one large diameter CCFL tube 1, a securing means 2 and a driver 3 and its housing 4 and an electrical connector 5 are formed into an unitary body and becomes a lamp.

The said means 2 secures the CCFL tube 1 onto the lamp housing and provides connection to the lighting fixture for the CCFL lamp. It can be made of metal, metallic wire, plastic, glass or porcelain. Its structural design is according to the need of the lamp fixture. The said means 2 can have at least one screw hole 10 or at least one insert 11 to connect lamp to lighting fixture. The said means 2 makes soft contact 12 with CCFL tube 1. It uses soft glue, silicon, resin, silicon rubber, plastic, UV harden glue or mechanical means to prevent the CCFL tube and lighting fixture from damaging during the repeated heat and cold cycles during operation and also provides good mechanical strength and shock absorbing ability to the lamp. The said means 2 secures CCFL tube 1 and united the CCFL tube 1, the lighting fixture, which includes the lamp housing, its transparent face plate and its reflector into a unitary body. Its design can be based on the actual needs of the lighting fixture. The electrical connect can be of any one of the existing electrical connectors.

FIG. 1 shows the large diameter CCFL tube 1 is of a straight or serpentine shape. It is arranged onto at least one leveled or concaved plane. FIG. 1 shows it is arranged onto a leveled plane. The said at least one CCFL tube 1 can have its CCFL tube in parallel arrangement, single layer cross arrangement, double layer or multiple layer parallel or cross arrangement. Figure one shows single layer parallel arrangement.

The said large diameter CCFL tube 1 is a vacuum sealed lamp. It uses either soft or hard glass. There is neon, argon, mercury or xenon gas inside the CCFL tube. It can also use other inert gases, such as helium, krypton. There is phosphor coating on the inside glass wall of the CCFL tube, it will turn the UV from gas discharge inside the CCFL tube into visible light.

The said at least one large diameter CCFL tube 1 can be emitting the same color of light or different colors of light. When emitting different colors of light, at least one of the CCFL tubes will use low color temperature phosphor, and at least one will use blue and green phosphor, or at least one with low color temperature phosphor and at least one with high color temperature phosphor, or at least one of each with red, green and blue phosphor or phosphor of any other colors.

The said driver 3 can also include dimming, adjustable color temperature, adjustable multiple color or timer control circuitries, to provide dimmable, adjustable color temperature, adjustable multiple colors or timer controlled luminaire. The said driver 3 can also include wireless control by using infrared, radio frequency, optical or sound control circuitries to provide wireless control for On/Off, dimming, adjustable color temperature and adjustable multiple colors luminaires.

Figure 2:
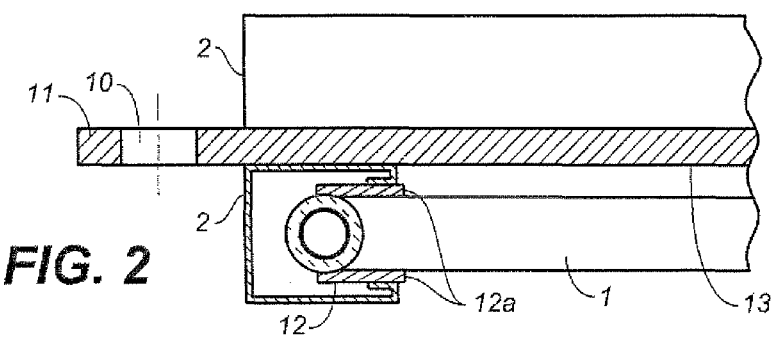
FIG. 2: The A-A illustration of FIG. 1.

FIG. 2 is the A-A cross sectional view of FIG. 1. FIG. 2 shows the contact 12 between the securing means 2 and the CCFL tube 1 is of soft cushioned contacts. Such as soft glue, silicon, resin, silicon rubber, plastic, UV hardened glue or mechanical means (12*a*) to prevent the CCFL and lighting fixture won't be damage during the heat and cold cycles during operation, and also provides good mechanical strength and shock absorbing capability. The said securing means 2 has reflective surface 13 facing the CCFL tube 1. The numbers used in FIG. 2 corresponds to numbers used in FIG. 1.

Figure 3:
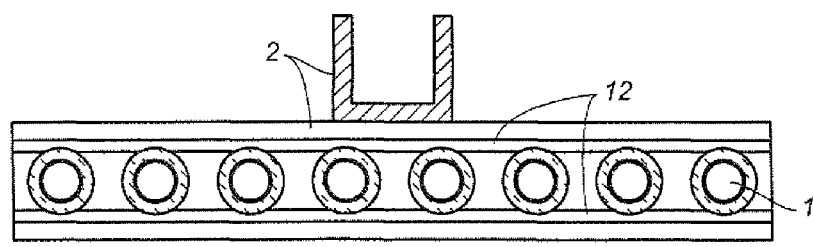
FIG. 3: The B-B illustration of FIG. 1.

FIG. 3 is the B-B cross sectional view from FIG. 1. The numbers used in FIG. 2 corresponds to numbers used in FIG. 1.

Figure 4:
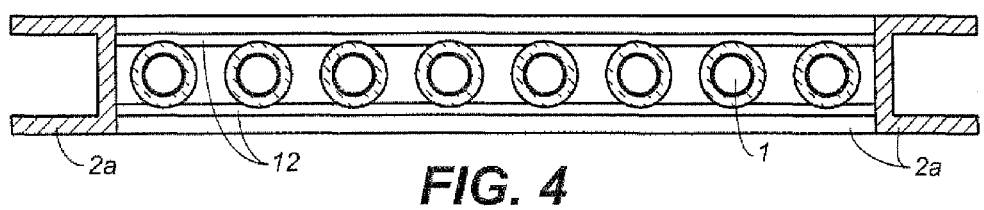
FIG. 4: Another B-B illustration of FIG. 1.

FIG. 4 is another illustration of the B-B cross sectional view from FIG. 1. It further illustrates the securing means 2*a* surrounding the CCFL tube 1. The numbers used in FIG. 4 corresponds to numbers used in FIG. 1.

Figure 5:
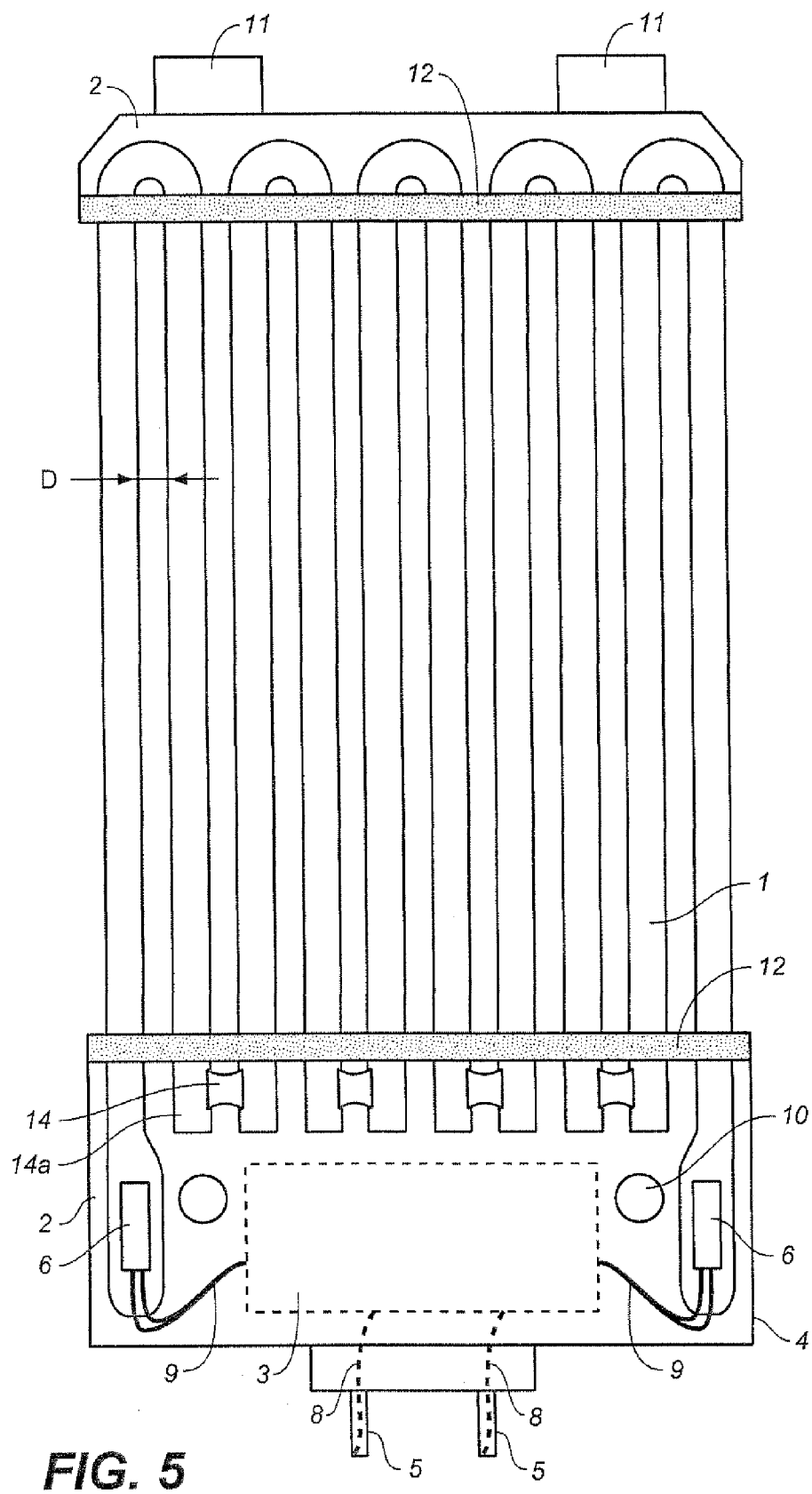
FIG. 5: Another preferred embodiment of High Lumen Output CCFL

FIG. 5 is another preferred embodiment of High Lumen Output CCFL of this invention. The said large diameter CCFL tube 1 is bent to form into at least two closely arranged sections. The distance D between the two adjacent CCFL tubes (such as D in FIG. 5) is less than 5 times the diameter of the CCFL glass lamp tubing. The said CCFL tube 1 is of a Multi-U shape using bridge forming technique. The point 14*a* of the bridge forming area can be used as the Cold Point for the CCFL tube. The numbers used in FIG. 5 corresponds to numbers used in FIG. 1.

FIG. 6 is another preferred embodiment of High Lumen Output CCFL of this invention. The said CCFL tube 1 is formed into a flat plane shape using single spiral winding technique winding alternatively to form two arrays on two planes, with substantially parallel sections in at least two arrays on planes that are substantially parallel to each other, but where the sections are laterally displaced across the two planes so that each of some sections in one array matches a space between two sections in the other array. The said CCFL tube 1 can also be formed into a flat plane shape using double spiral winding technique. FIG. 6 illustrates the form using single spiral winding technique. FIG. 6(A) is the front view, FIG. 6(B) is the side view, FIG. 6(C) is the bottom view. 1*a* and 1*b* is the two layers of CCFL glass lamp tubing. There is at least one supporting means 15 between these two layers of CCFL glass lamp tubing to increase the mechanical strength of the CCFL structure. The said supporting means can be square shape or cylindrical shape of rod, made of glass, steel reinforced glass, metal, plastic or porcelain. There is soft cushion type of glues between the supporting means and the CCFL glass lamp tubing, such as soft silicon, resin, silicon rubber, UV hardened glue or plastics. The numbers used in FIG. 6 corresponds to numbers used in FIG. 1. As can be seen from FIG. 6(C), at least one of the sections on one of the at least two arrays is connected to two adjacent sections on the other of the at least two arrays to form a three dimensional serpentine shaped portion of the CCFL tube.

Figure 7:
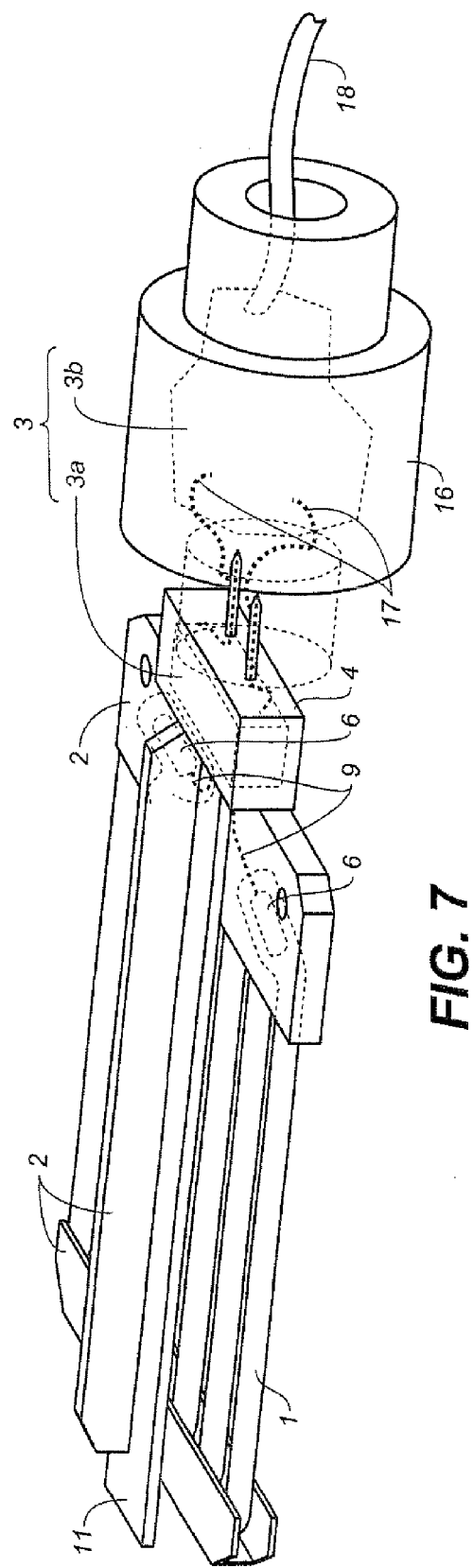
FIG. 7: Another preferred embodiment of High Lumen Output CCFL.

FIG. 7 is another preferred embodiment of High Lumen Output CCFL of this invention. The said at least one CCFL tube 1, securing means 2 and electrical connector 5 formed into an unitary lamp body. The driver 3 can be installed with CCFL tube 1 and included in this unitary lamp body, or it can be installed separately away from this unitary lamp body. It can also only install part of the driver (as illustrated in FIG. 7, 3*a*), such as the high voltage transformer and its accessories (e.g., inductor and capacitor) with the CCFL tube 1 into a unitary lamp body. The other parts of the driver (as illustrated in FIG. 7, 3*b*) can be installed in a separated places in the lighting fixture, such as the inside of the electrical connector 16 of the lighting fixture. The connecting wire 17 connects these two parts of the driver. The wire 18 is used to connect to outside power source. The numbers used in FIG. 7 corresponds to numbers used in FIG. 1.

Figure 8:
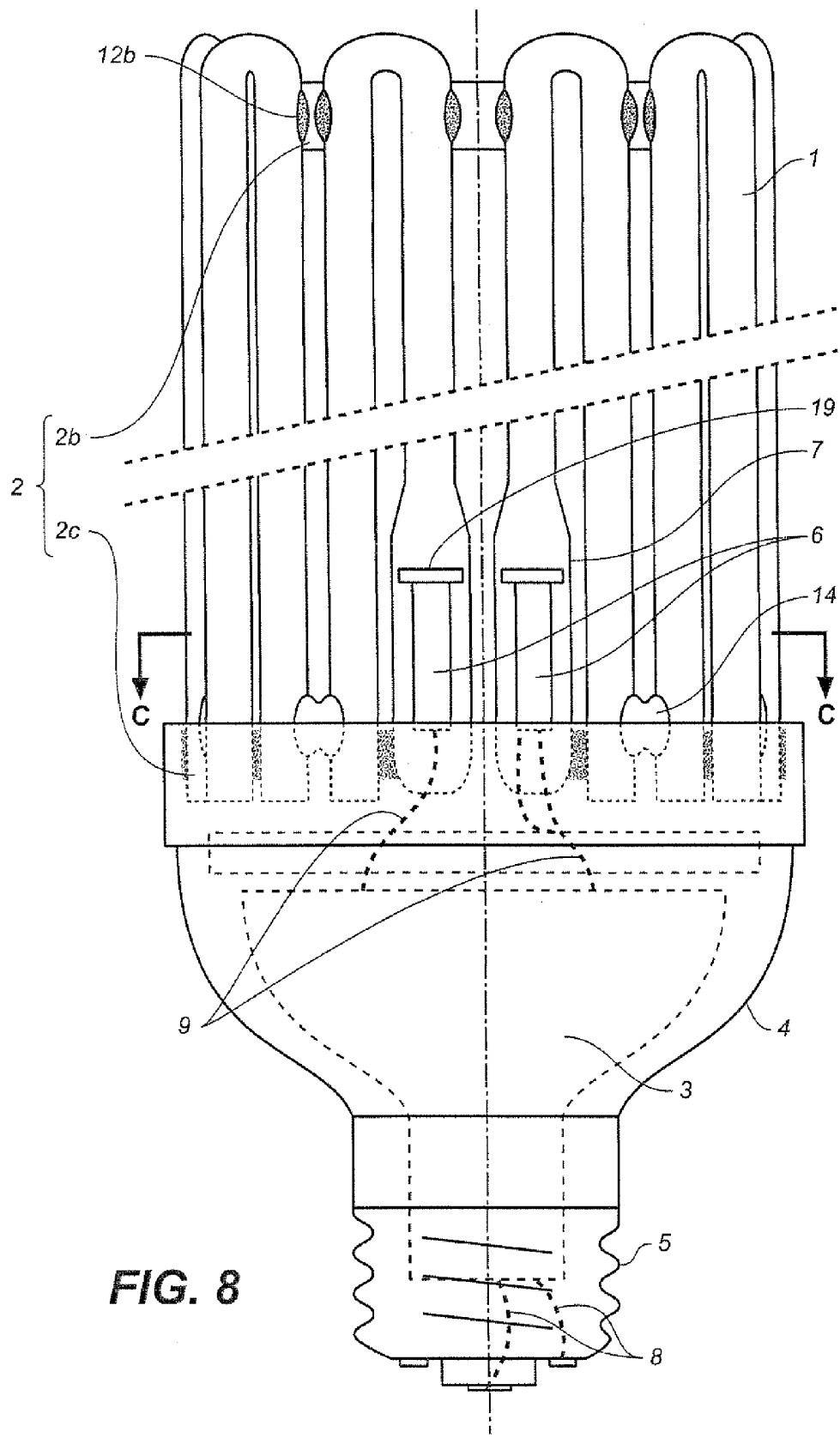
FIG. 8: Another preferred embodiment of High Lumen Output CCFL.

FIG. 8 is another preferred embodiment of High Lumen Output CCFL of this invention. The said at least one CCFL tube 1 is arranged onto at least one concave or cylindrical surface. CCFL tube 1 is of a Multi-U shape formed by bridge forming of the glass lamp tubing and arranged to form into a circular shape. The cross sectional view C-C will be illustrated in FIGS. 9, 10 and 11. The large diameter CCFL glass lamp tubing is bent into a closely spacing Multi-U shape or formed into Multi-U shape using bridge forming technique.

The said CCFL tube 1 is secured by securing means 2*b* from top and 2*c* from the bottom. There is glue means 12*b* between the CCFL glass lamp tubing and the securing means. The top securing means 2*b* can be a circular tubing or rod, made of glass, plastic, metal or porcelain. The bottom securing means 2*c* is the top part of the driver housing 4, made of plastic or porcelain. The electrode 6 in FIG. 8 is the kind with porcelain cap 19 used for Neon Light.

The said driver 3 and its housing 4, CCFL tube 1 and electrical connector 5 can be formed into a unitary lamp body. The driver 3 can also be removed from CCFL tube 1, such as just installs its high voltage transformer and its accessories (such as inductor and capacitor) with CCFL tube 1, housing 4 and electrical connector 5 into a unitary lamp body, and install the rest part of the driver onto the lighting fixture or other places.

The said electrode's glass enclosure 7 and the CCFL tube 1 situates in the same level plane or concave plane, or it can be bent backward to the backside of the CCFL tube. The numbers used in FIG. 8 corresponds to numbers used in FIG. 1 and FIG. 5.

Figure 9:
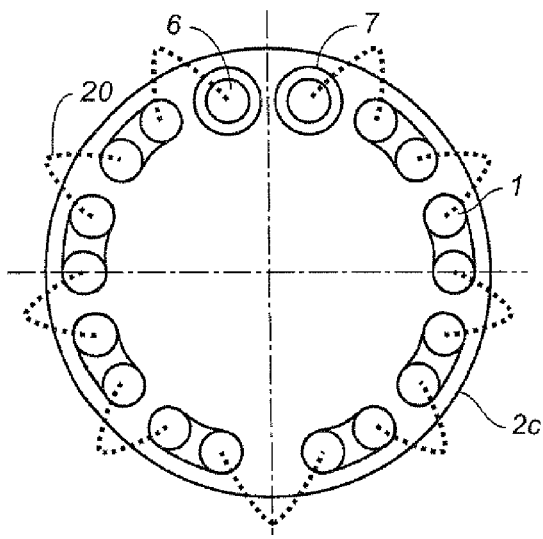
FIG. 9: The C-C illustration of FIG. 8.

FIG. 9 is the C-C cross sectional view from FIG. 8. The dotted line 20 represents the top part of the "U" shapes CCFL tube 1. The numbers used in FIG. 9 corresponds to numbers used in FIG. 8.

Figure 10:
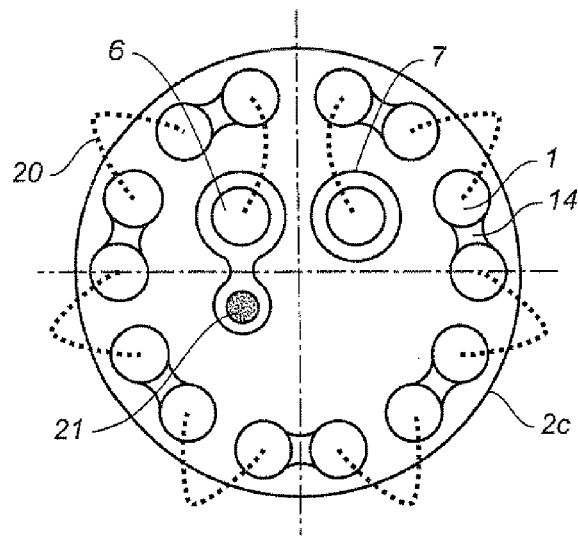
FIG. 10: Another C-C illustration of FIG. 8.

FIG. 10 is another C-C cross sectional view from FIG. 8. The emphasis is the said CCFL tube 1 is of a Multi-U shape formed by bridge forming. The dotted line 20 represents the top part of the "U" shapes CCFL tube 1. 14 is the bridge forming point of the CCFL tube 1. The electrode 7 is arranged to be formed inside the circular Multi-U shaped CCFL tube 1. There is high temperature amalgam 21 being placed at place either near the at least one electrode 6, or at other place of the said at least one CCFL tube 1. The numbers used in FIG. 10 corresponds to numbers used in FIGS. 8 and 9.

Figure 11:
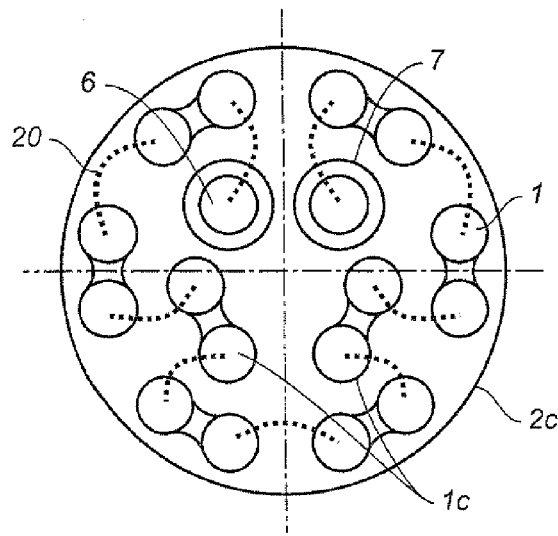
FIG. 11: Another C-C illustration of FIG. 8.

FIG. 11 is another C-C cross sectional view from FIG. 8. The emphasis is the electrode 7 and the 1c part of CCFL tube 1 is arranged to be formed inside the circular arrangement of the CCFL glass lamp tubing. The numbers used in FIG. 11 corresponds to numbers used in FIG. 9.

Figure 12:
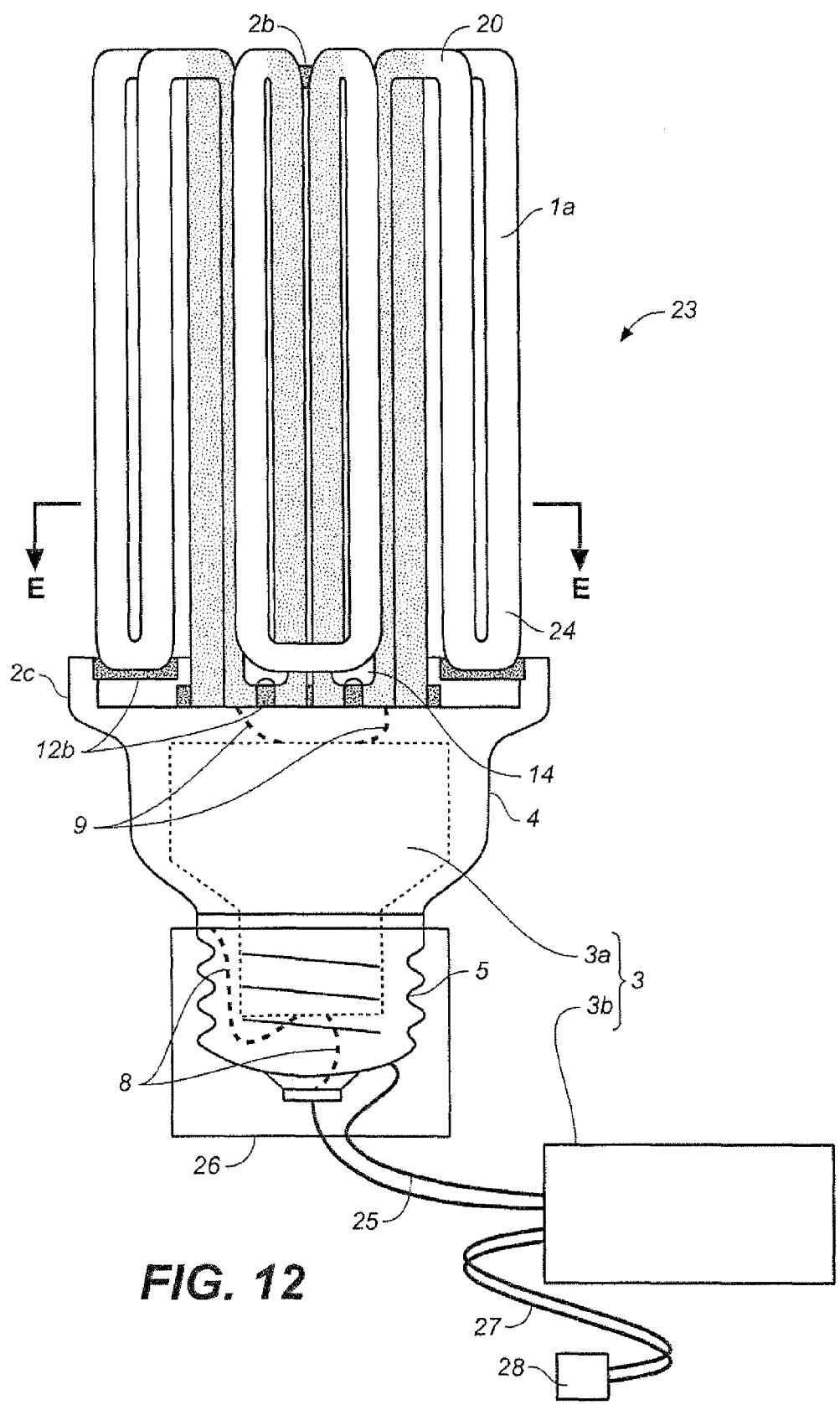
FIG. 12: Another preferred embodiment of High Lumen Output CCFL.

FIG. 12 is another preferred embodiment of High Lumen. Output CCFL of this invention. FIG. 12 illustrates a separately formed lamp from its driver. The part 3a of the lamp driver, such as the high voltage transformer and its accessories is grouped with CCFL tube 1 to form a retrofitted lamp 23. The part 3b of the driver is separated from the lamp body and can be installed in other places of the lighting fixture. The said CCFL tube 1 is secured by top securing means 2b and bottom securing means 2c. There is glue 12b between the securing means and the CCFL 1 glass lamp tubing. The top securing means 2b can be small circular tubing, rod or small metal plate with glue 12b. The said small circular tubing or rod can be made of glass, plastic, metal or porcelain. The bottom securing means 2c is the top part of the driver housing 4, made of plastic, porcelain or metal. The said retrofit lamp 23 is connected to the other part of driver 3b through lamp receptacle 26, which is connected to 3b through wire 25. 28 is the means to connect to outside power and wire 27 connects the outside power source to driver part 3b.

Figure 13:
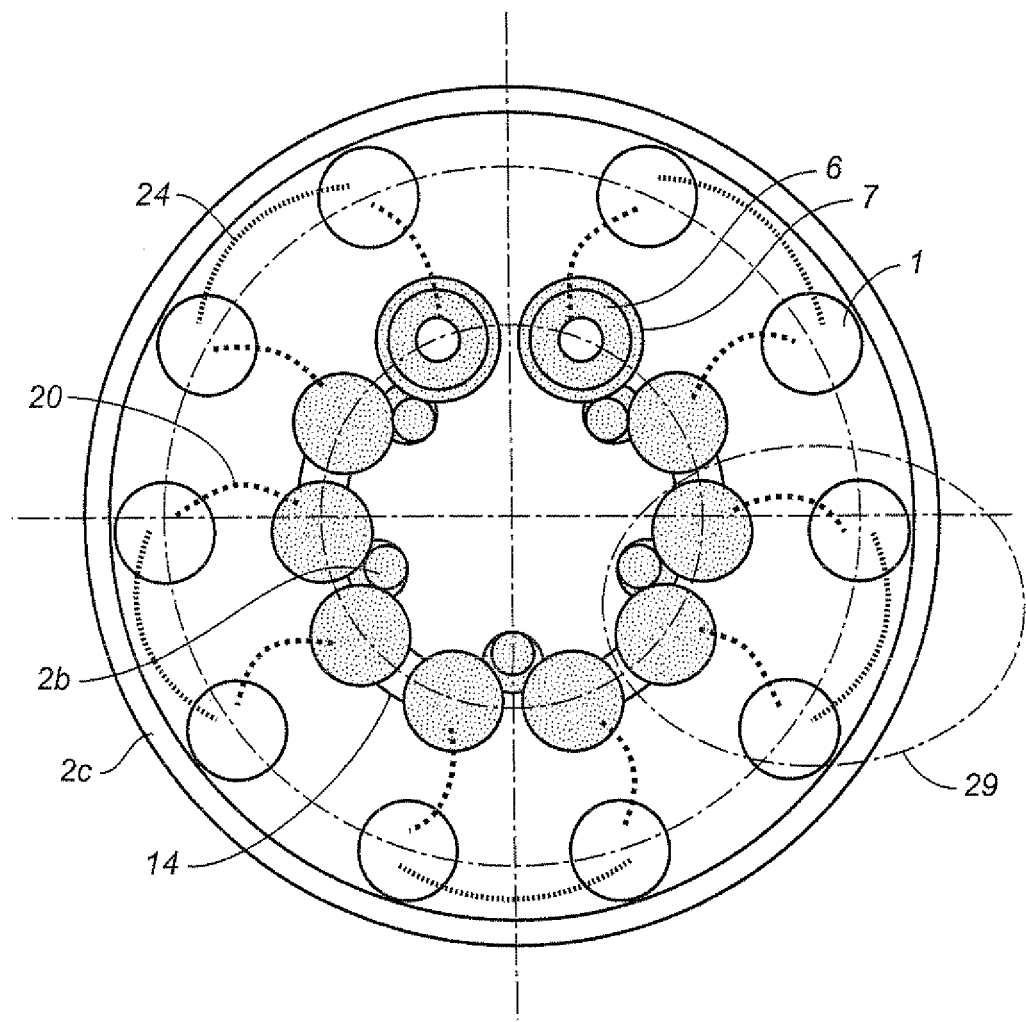
FIG. 13: Another E-E illustration of FIG. 12.

FIG. 13 is a E-E cross sectional view from FIG. 12. The said CCFL tube 1 is arranged as illustrated in FIGS. 12 and 13. It is formed by at least two Multi-U shape CCFL glass lamp tubing with at least two "U" (as illustrated by 29 in FIG. 13) connected together by bridge forming technique. 20 represents the concave top parts of the "U" shape CCFL glass lamp tubing and 24 represents the bottom part of the bending of the CCFL 1 glass lamp tubing. 14 is the point to connect the CCFL 1 glass lamp tubing with bridge forming technique. The driver can be packaged with CCFL tube 1 into a unitary lamp body, or can be separated from CCFL tube 1 and form separated lamp from its driver. 29 represent a single CCFL 1 glass lamp tubing unit for the sake of manufacturing. This is the two "U" (as illustrated by 29 in FIG. 13) connected together by bridge forming technique. These units are secured from inside the circular round shape by top securing means 2b.

The numbers used in FIG. 13 corresponds to numbers used in FIG. 12.

Figure 14:
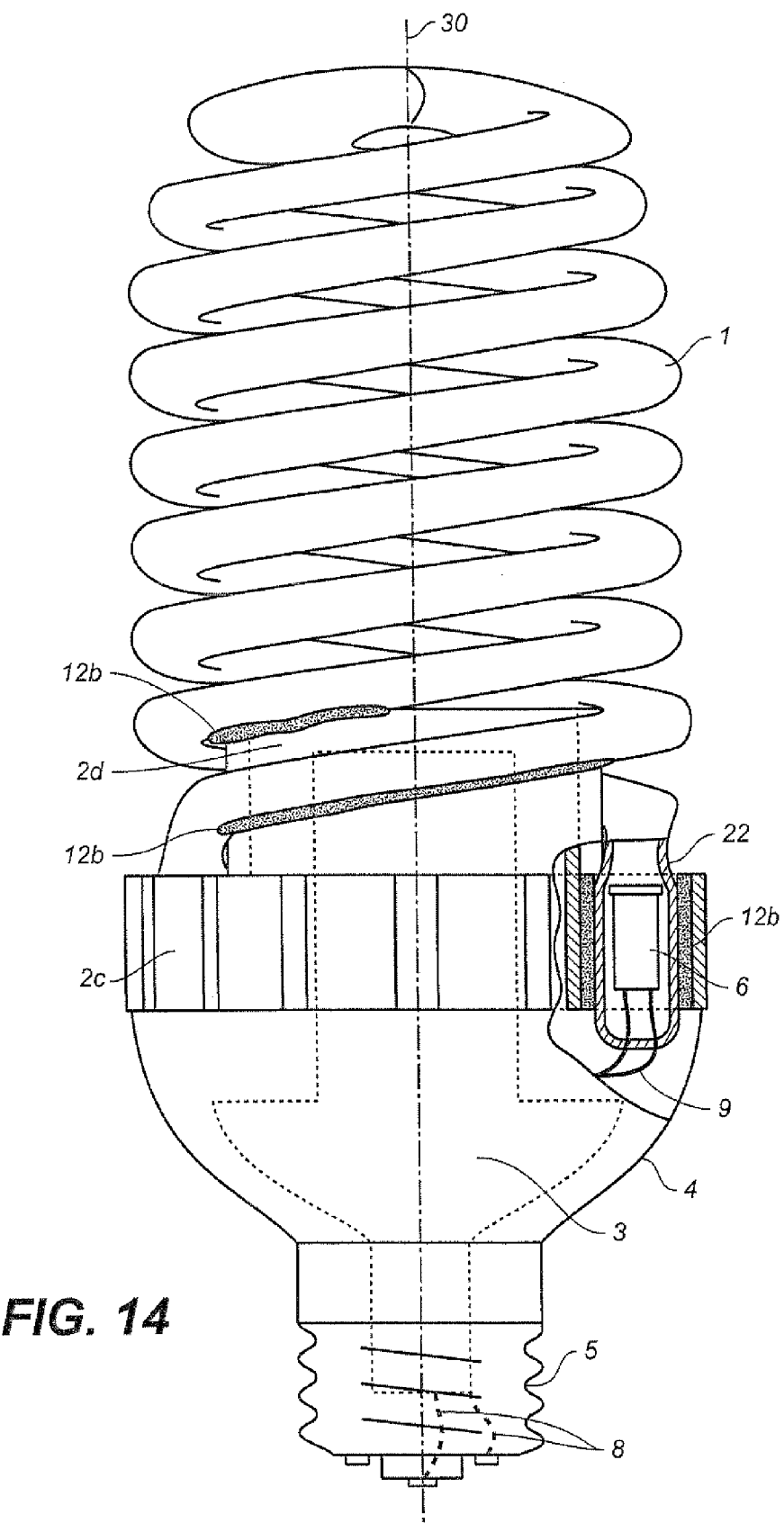
FIG. 14: Another preferred embodiment of High Lumen Output CCFL.

FIG. 14 is another preferred embodiment of High Lumen Output CCFL of this invention. The said CCFL tube 1 is of a Pagoda shaped formed by double spiral winding technique. There is a hole 22 on the top part 2e of both sides of the said driver housing 4 for the housing of the electrode of the CCFL tube 1 to provide mechanical support for the CCFL tube 1. The top driver housing 4 has a protruded part 2d to be used to secure with the at least one winding of the double spiral shaped CCFL tube 1 with glue 12b. The said glass enclosure 7 of the electrode is arranged in either parallel or perpendicular to the axis 30 of the double spiral shaped CCFL tube 1. It can also be arranged in the same direction as the double spiral winding of the CCFL 1 glass lamp tubing. FIG. 14 illustrates the parallel arrangement to the axis 30 of the double spiral shaped CCFL tube 1.

Figure 15A:
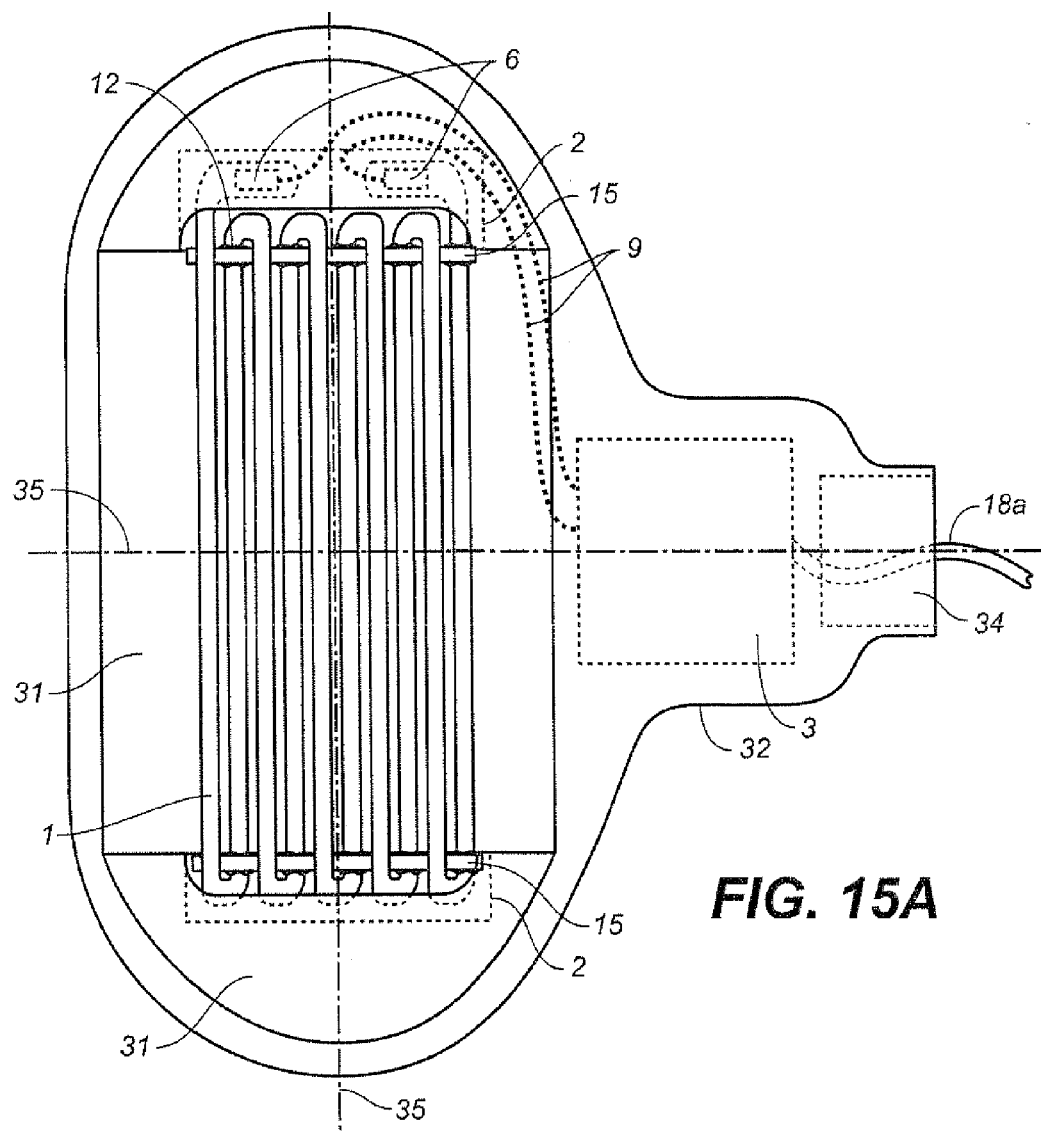
FIGS. 15A and 15B: Another preferred embodiment of High Lumen Output CCFL for Street lamp.
Figure 15B:
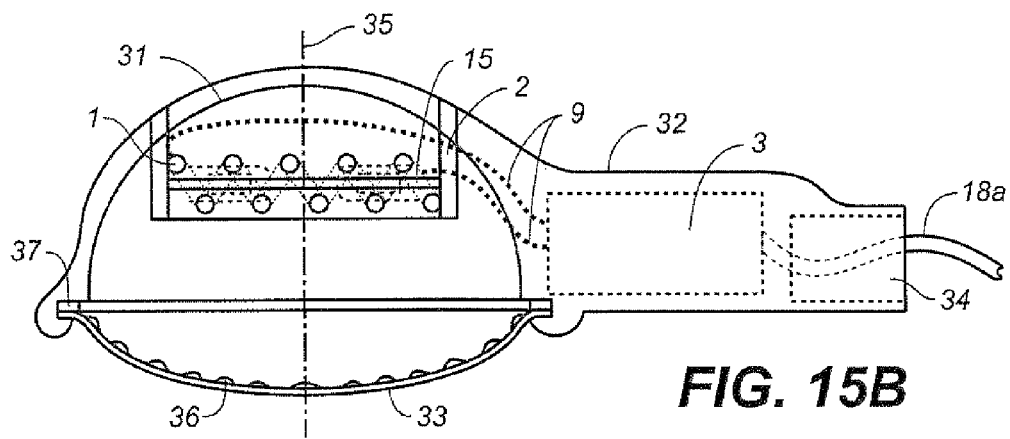

FIG. 15 is a preferred embodiment of the invention in applying the High Lumen Output CCFL for street lamp. FIG. 15(A) is the front view of the CCFL street lamp of this invention. FIG. 15(B) is the side view. It has at least one High Lumen Output CCFL tube 1. Its shape can be of any shapes included in this invention. FIG. 15 illustrates a flat plane shape formed by using single spiral winding technique. 2 is the means used to secure the CCFL glass lamp tubing. 31 is a reflector. 32 is the street lamp housing. 33 is the transparent face plate of the street lamp 32. 3 is the at least one driver. 18a is the means used to connect to outside power source. The said means 18a can be electrical connector or electrical cable. FIG. 15 illustrates the use of cable to connect to outside power source to receive power. 34 is mechanical securing means to secure said street lamp onto street lamp pole, tunnel lamp rack or other lighting fixtures. The said lamp housing 32 units the High Lumen Output CCFL tube 1, reflector 31, securing means 2, transparent face plate 33, driver 3 and outside power connection means 18a and mechanical securing means 34 into a unitary lamp body. The driver 3 receives its input power through the connection of 18a to outside power source. The driver 3 connects to the electrode 6 of the High Lumen Output CCFL tube 1 through output wire 9. When outside power is connected to driver 3, it will turn on the said CCFL street lamp.

Figure 16:
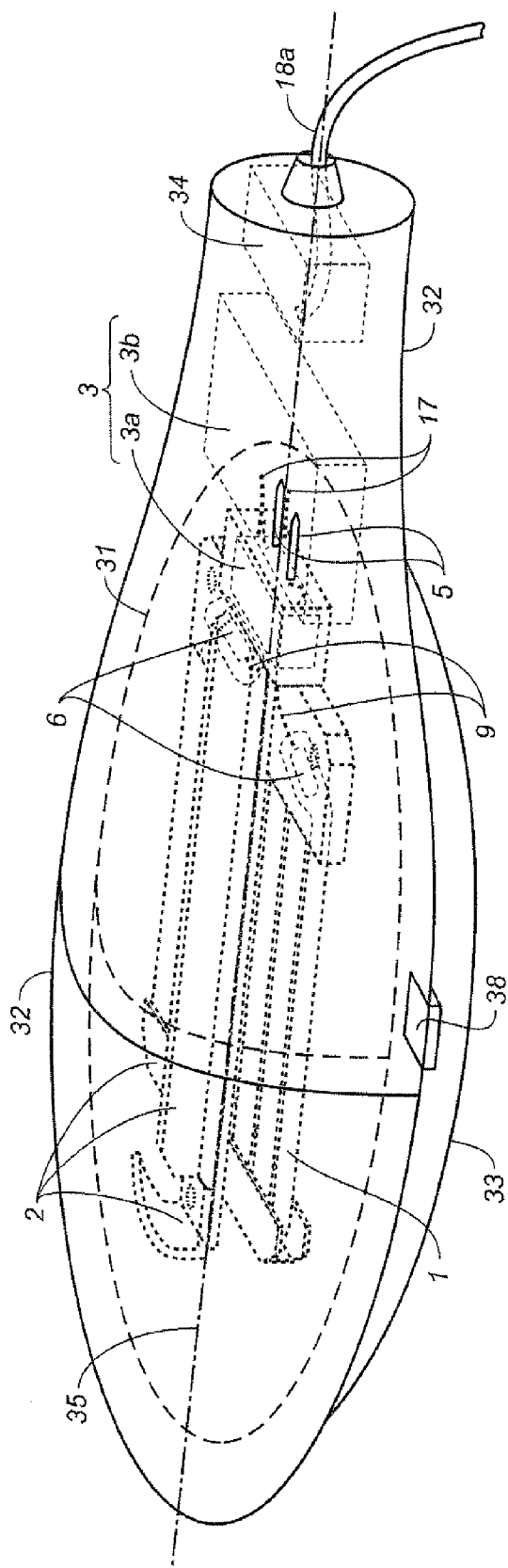
FIG. 16: Another preferred embodiment of High Lumen Output CCFL for Street lamp.

The CCFL tube 1 can be arranged perpendicular to the axis 35 of the street lamp, or parallel to axis 35 of street lamp as illustrated in FIG. 16.

The said driver 3 can also include timer control circuitry to control the turning On/Off of the said lamp, to further save energy.

The said reflector 31 is designed according to the need for its illumination pattern. The reflector can be placed on the side, the top, or surrounding the CCFL 1 glass lamp tubing. It is made of high reflective aluminum, aluminum alloy, high reflective metal alloy or metal or plastic part with high reflective coating.

The said transparent face plate 33 can have flat, concave, cylindrical or conical surfaces made of glass, steel reinforced glass, safety glass or plastic. There can be little optical lens designed into either surfaces to enhance the distribution of light pattern according to the need of the application.

The said lamp housing 32 is made of metal or plastic. The transparent face plate 33 is attached to the lamp housing 32 through sealing washer or glue to provide water proof to the lamp housing for outdoor application. The said lamp transparent face plate 33 is attached to lamp housing 32 through mechanical means 38, which can be easily removed for the convenience of repair and maintenance. The said lamp housing 32 and its transparent face plate 33 can be designed in various shapes. The numbers used in FIG. 15 corresponds to numbers used in FIG. 1 and FIG. 6.

FIG. 16 is another preferred embodiment of the invention in applying the High Lumen Output CCFL for street lamp. The said CCFL tube 1 is of the serpentine shape as described in FIG. 1. The CCFL 1 glass lamp tubing is arranged in parallel to the axis 35 of the street lamp. The numbers used in FIG. 16 corresponds to numbers used in FIG. 1 and FIG. 15.

Figure 17:
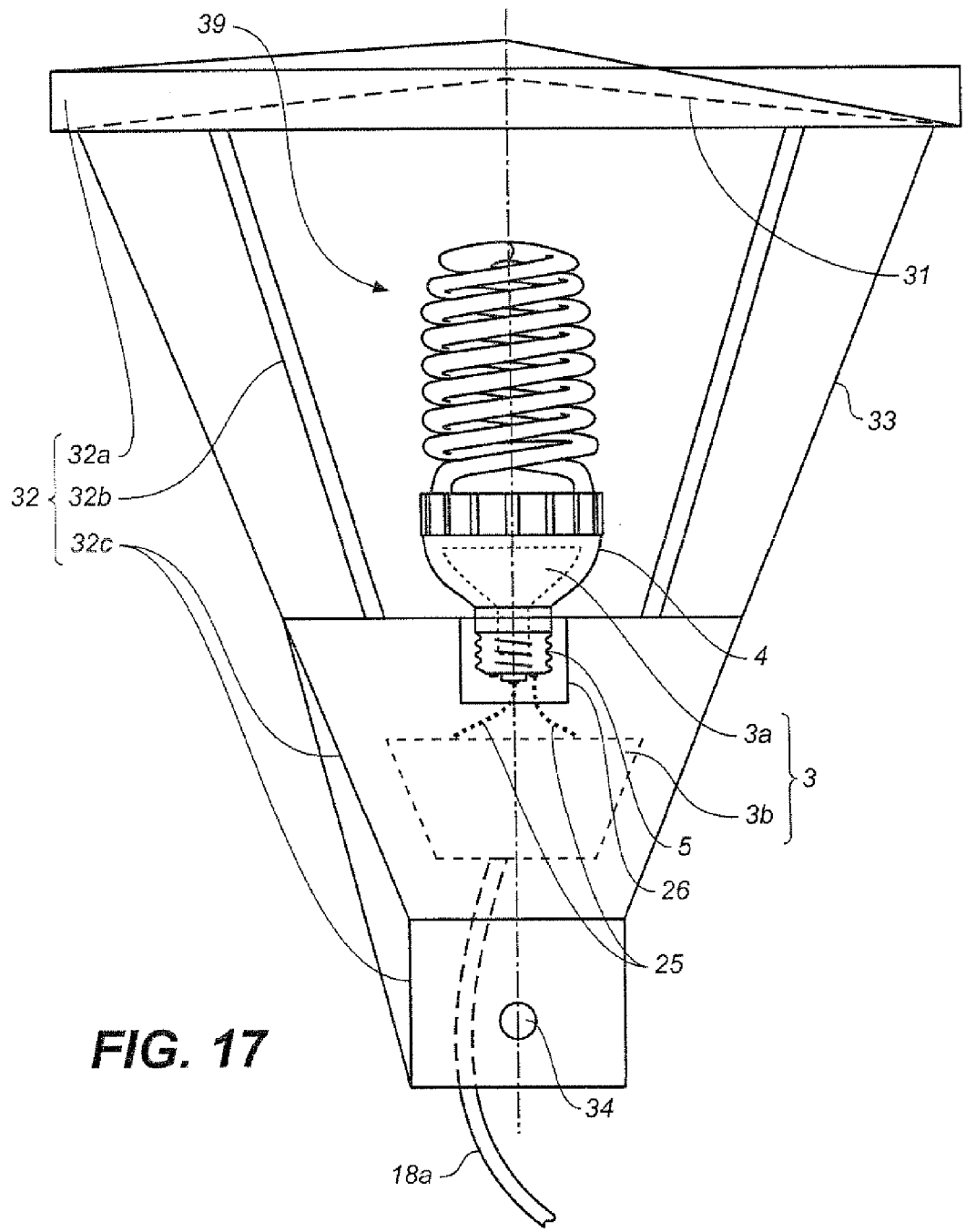
FIG. 17: Another preferred embodiment of High Lumen Output CCFL for Street lamp.

FIG. 17 is another preferred embodiment of the invention in applying the High Lumen Output CCFL for street lamp. The emphasis is the said High Lumen Output CCFL 39 is of the shape of single layer of double spiral winding as described in FIG. 14. The said lamp housing 32 consists of street lamp top part 32a, bottom part 32c and the middle part of connection rod 32b that connects them together. The transparent face plate 33 is of conical or cylindrical shape. The transparent face plate 33 is sealed with water proof mean to the top part 32a of the lamp housing. The lamp housing 32 and its transparent face plate 33 can be designed into various shapes. The numbers used in FIG. 17 corresponds to numbers used in FIG. 16 and FIG. 14.

FIG. 18 is a preferred embodiment of the invention in applying the High Lumen Output CCFL for signage lamp. (A) is its front view, (B) is its side view. It consists of at least one High Lumen Output CCFL 1. FIG. 18 illustrates the use of three CCFL tube 1 using either the same color phosphor or three different color phosphors. Such as using at least one of each CCFL tube using red, blue and green color phosphor respectively (1a, 1b, 1c). 40 is the securing means of the signage lamp. The said driver 3 receives control signal from advertising signage company (such as 41 illustrated in FIG. 20) to control the On/Off, adjustment of lamp intensity and its color to construct dynamic display pattern according to the programmed pattern of the control system to provide energy saving signage lighting. The lamp illustrated in FIG. 18 can also be used for static illumination. The numbers used in FIG. 18 corresponds to numbers used in FIG. 15.

FIGS. 19A and 19B illustrate another preferred embodiment of the invention in applying the High Lumen Output CCFL for signage lamp. FIG. 19A is its front view; FIG. 19B is its side view. The emphasis is the said High Lumen Output CCFL tube 1 consists of three CCFL tubes (1d, 1e, 1f) arranged on the same flat plane or concave plane, formed into a flat plane shape using single spiral winding technique, such as illustrated in FIG. 6. FIG. 19 illustrates that the three CCFL tubes situated on the same flat plane can emit same color light or different color lights. The numbers used in FIG. 19 corresponds to numbers used in FIGS. 15 and 18.

Figure 20:
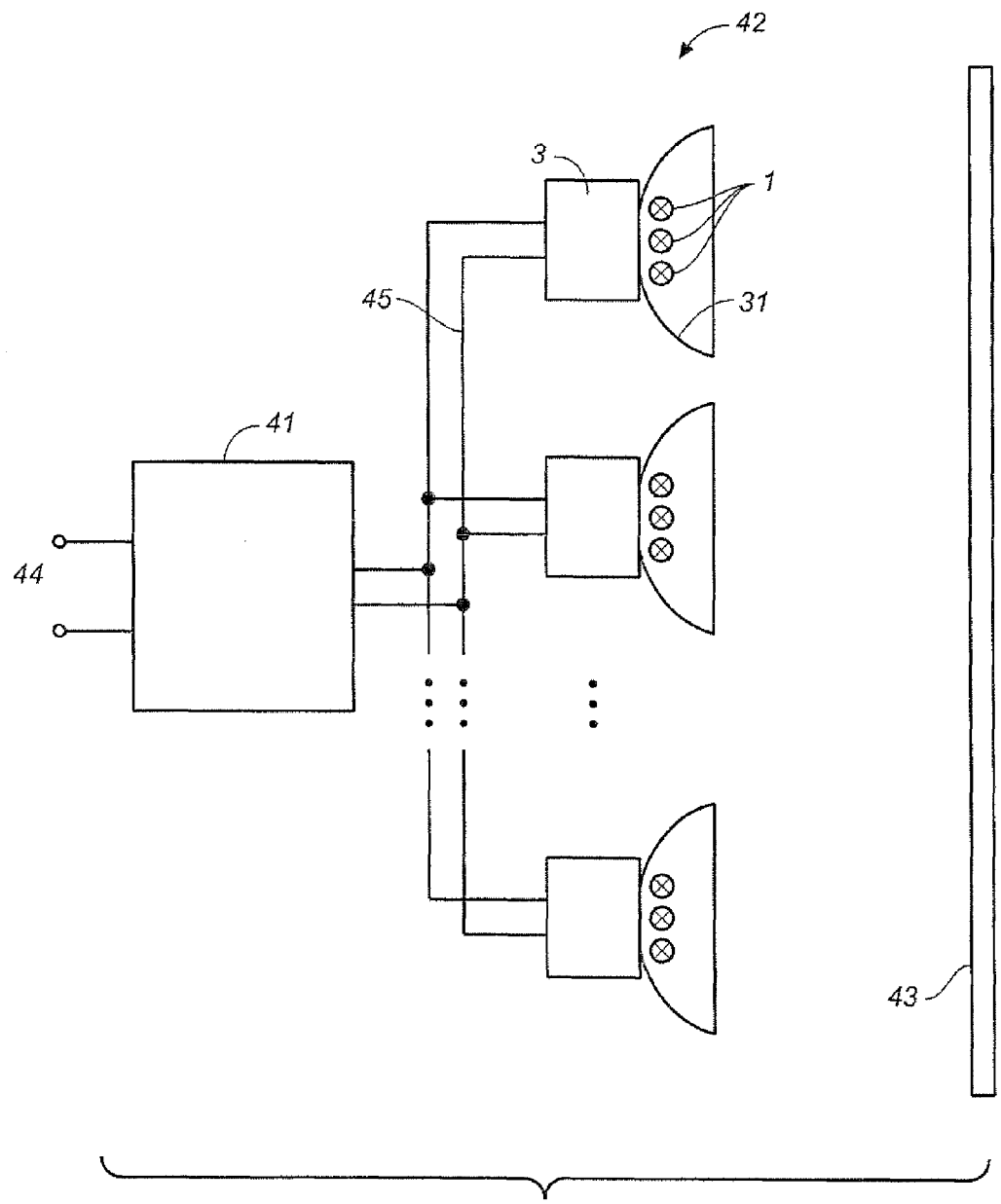
FIG. 20: Another preferred embodiment of High Lumen Output CCFL control system for signage applications.

FIG. 20 is an example of a block diagram of electrical system used to control the High Lumen Output CCFL signage lamp in this invention. The lighting system consist at least one dynamic Signage lamp 42 with adjustable color capability. 41 is the lighting controlling system. 43 represent the advertisement board, building or point of interest for illumination. The at least one dynamic Signage lamp 42 can be installed on the top, the bottom of both top and bottom or surrounding the illuminated object. The outside power source can be DC or AC power. Such as DC power from solar panel or its associated battery, or from city AC power. The said lighting control system uses at least one wire 45 to send power and control signal to the dynamic signage lamp 42 through out the lighting system. The said at least one dynamic adjustable color Signage lamp and the lighting controlling system forms a dynamic advertising signage illumination system.

The said lighting controlling system 41 can store multiple illumination patterns to be selected by users. For example: white light illumination, various color temperature white light illumination, adjustable color intensity illumination, timer controlled various lighting intensity illumination, dynamic flashing illumination, left, right scanning illumination, scanning from left or right progressively turning on each lamp until the whole system is turned on, adjustable color illumination in various colors, full color illumination with gray scale on each color, red, green, blue flashing or jumping illumination. When there are Signage lamp installed on top, bottom or surrounding the illumination object, the illumination pattern can also incorporated the On/Off of these lamps in various patterns. Once the lighting control system is connected to outside power source, the said dynamic advertising signage illumination system can perform according to its programming. The numbers used in FIG. 20 corresponds to numbers used in FIG. 19.

This invention is seeking protection for embodiments not necessarily restricted to what has been described herein. The associated technology shall be well known to Once the skill people familiar to this art understand the content and characteristic of the embodiments described herein, many variations of what has been described can be realized. While the invention has been described above by reference to various embodiments, it will be understood that changes and modifications may be made without departing from the scope of the invention, which is to be defined only by the appended claims and their equivalents.

Description of meaning represented by numbers used in figures:

| 1 - CCFL tube 1 | 2, 2b, 2c, 2d - securing means | 3 - driver |
| --- | --- | --- |
| 2a - part of driver | 3b - part of driver | 4 - driver housing |
| 5 - electrical connector | 6 - electrode | 7 - glass enclosure of electrode |
| 8 - input wire to driver | 9 - output wire from driver | 10 - securing hole |
| 11 - securing insert | 12 - soft contact | 12a - glue or opening for mechanical insert |
| 13 - reflective coating | 14 - bridge forming point of CCFL tube 1 | 14a - top portion of the CCFL tube 1 after bridge forming |
| 15 - securing means | 16 - connector of lighting fixture | 17 - connecting wire |
| 18 - output wire | 19 - porcelain cap of neon electrode | 20 - Top portion of the "U" shape CCFL tube 1 |
| 21 - high temperature amalgam | 22 - hole for installing electrode of CCFL | 23 - connecting wire |
| 24 - bottom part of "U" shape CCFL tube 1 | 25 - connecting wire | 26 - electrical receptacle |
| 27 - connecting wire | 28 - electrical connection means | 29 - CCFL tube 1 unit |
| 30 - spiral CCFL tube 1 axis | 31 - lamp reflector | 32 - lamp housing |

-continued

| | | |
|---|---|---|
| 33 - lamp transparent face plate | 34 - lamp securing means | 35 - lamp axis |
| 56 - little optical lens | 57 - sealing ring | 58 - mechanical clamp |
| 59 - screw | 40 - lamp securing means | 41 - controlling system |
| 42 - dynamic lamp | 44 - outside power source | 45 - connection wire |

What is claimed:

1. A high lumen output cold cathode fluorescent lamp (CCFL) device, comprising:
    at least one CCFL tube containing two electrodes: an anode and a cathode;
    a supporting structure attached to the cold cathode fluorescent lamp tube;
    at least one driver having an input and an output;
    a driver housing containing said at least one driver; and
    an electrical connector;
        wherein an input of the driver is connected to a power source through the electrical connector, and the output of the driver is connected to the electrodes of the cold cathode fluorescent lamp tube;
        wherein said supporting structure, said driver housing, said at least one CCFL tube and said electrical connector are connected to form a unitary lamp with the following characteristics:
        said at least one CCFL tube having an inside diameter of 3~16 mm; the length between the anode and cathode being about 200~1000 times of the inside diameter of the at least one CCFL tube; the electron emission area of the cathode being in a range of about 100~2,000 $mm^2$; and the ratio of electrode current to the electron emission area of the cathode being in a range of about 0.01~0.2 $mA/mm^2$.

2. The device of claim 1, wherein said at least one CCFL tube is arranged onto at least one flat plane, concave plane or cylindrical plane.

3. The device of claim 2, wherein said at least one CCFL tube comprises an array of elongated sections that are aligned along substantially the same direction; said sections being on at least two different flat or curved planes adjacent to one another, and wherein at least one of the sections on one of the at least two planes is connected to two adjacent sections on the other of the at least two planes to form a three dimensional serpentine shaped portion of the CCFL tube.

4. The device of claim 2, wherein the distances between the at least one section and the two adjacent sections is less than 5 times an outside diameter of the CCFL tube.

5. The device according to claim 1, said at least one CCFL tube comprises an array of elongated sections that are aligned along substantially the same direction to form two layers that are on flat planes or concave planes.

6. The device according to claim 5, further comprising at least one supporting means between the two layers of the CCFL tube to increase the mechanical strength of the CCFL tube, said supporting means comprising glass, steel reinforced glass, metal, plastic or porcelain, and a soft cushion supporting layer.

7. The device according to claim 6, said soft cushion supporting layer comprising soft glue, silicon rubber, resin, plastic, UV hardened glue or a mechanical device.

8. The device according to claim 1, the CCFL tube having an axis, wherein the electrodes are aligned either parallel or perpendicular to the axis of the CCFL tube.

9. The device according to claim 1, wherein said device comprises at least two CCFL tubes emitting different color of light, with one of the at least two CCFL tubes emitting low color temperature light, and the other one of the at least two CCFL tubes emitting blue and green light or high color temperature light.

10. The device according to claim 1, said at least one CCFL tube containing high temperature mercury amalgam.

11. The device according to claim 1, wherein said at least one CCFL tube is operated on AC power, and each of the two electrodes is located at one of the two ends of the CCFL tube, the operating current between the two electrodes being such that the operating current density of the device is within a range of about 0.8~8 $mA/mm^2$.

12. The device according to claim 1, said at least one driver comprising a transformer and other circuit elements, said at least one CCFL tube, driver housing and supporting structure connected to forth a unitary body, wherein said other circuit elements are not part of the unitary body.

13. The device according to claim 1, said driver controlling device operations including dimming and adjustment of color temperature or multiple colors.

14. The device according to claim 1, further comprising at least one reflector, and a transparent face plate.

15. A high lumen output cold cathode fluorescent lamp (CCFL) device, comprising:
    at least one CCFL tube containing two electrodes: an anode and a cathode;
    a supporting structure attached to the cold cathode fluorescent lamp tube;
    at least one driver having an input and an output;
    a driver housing containing said at least one driver; and
    an electrical connector;
        wherein an input of the driver is connected to a power source through the electrical connector, and the output of the driver is connected to the electrodes of the cold cathode fluorescent lamp tube;
        wherein said supporting structure, said driver housing, said at least one CCFL tube and said electrical connector are connected to form a unitary lamp with the following characteristics:
        said at least one CCFL tube having an inside diameter of 3~16 mm; said CCFL device having an efficiency in converting power from the power source to light output of not less than about 55 lumen/W.

16. The device according to claim 15, the length between the anode and cathode being about 200~1000 times of the inside diameter of the at least one CCFL tube.

17. The device according to claim 15, the electron emission area of the cathode being in a range of about 100~2,000 $mm^2$.

18. The device according to claim 15, the ratio of electrode current and cathode emission area being in a range of about 0.01~0.2 $mA/mm^2$.

19. The device according to claim 15, wherein the efficiency of said CCFL device in converting power from the power source to light output is not less than about 45 lumen/W after 5,000 hours of operation.

20. The device according to claim 15, wherein the length of the at least one CCFL tube is at least about 1000 mm.

21. A high lumen output cold cathode fluorescent lamp (CCFL) device, comprising:
- at least one CCFL tube containing two electrodes: an anode and a cathode;
- a supporting structure attached to the cold cathode fluorescent lamp tube;
- at least one driver having an input and an output;
- a driver housing containing said at least one driver; and
- an electrical connector;
- wherein an input of the driver is connected to a power source through the electrical connector, and the output of the driver is connected to the electrodes of the cold cathode fluorescent lamp tube;
- wherein said supporting structure, said driver housing, said at least one CCFL tube and said electrical connector are connected to form a unitary lamp with the following characteristics:
- the ratio of electrode current and cathode emission area being in a range of about 0.01~0.2 mA/mm$^2$; said CCFL device having an efficiency in converting power from the power source to light output of not less than about 55 lumen/W.

22. The device according to claim 21, said at least one CCFL tube having an inside diameter of about 3~16 mm.

23. The device according to claim 21, the length between the anode and cathode being about 200~1000 times of the inside diameter of the at least one CCFL tube.

24. The device according to claim 21, the electron emission area of the cathode being in a range of about 100~2,000 mm$^2$.

25. The device according to claim 21, wherein the efficiency of said CCFL device in converting power from the power source to light output is not less than about 45 lumen/W after 5,000 hours of operation.

26. The device according to claim 21, wherein the length of the at least one CCFL tube is at least about 1000 mm.

* * * * *